(12) United States Patent
Ishii et al.

(10) Patent No.: US 6,609,593 B2
(45) Date of Patent: Aug. 26, 2003

(54) DISC BRAKE

(75) Inventors: Hideaki Ishii, Yamanashi (JP); Takahiro Tokunaga, Yamanashi (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/941,846

(22) Filed: Aug. 30, 2001

(65) Prior Publication Data

US 2002/0050428 A1 May 2, 2002

(30) Foreign Application Priority Data

Aug. 31, 2000 (JP) .................................. 2000-263478
Nov. 30, 2000 (JP) .................................. 2000-365341

(51) Int. Cl.$^7$ .............................................. F16D 65/14
(52) U.S. Cl. ................................. 188/73.44; 277/636
(58) Field of Search .......................... 277/636, 635, 277/634, 641; 188/73.43, 73.44, 73.45

(56) References Cited

U.S. PATENT DOCUMENTS

| 4,327,925 A | * | 5/1982 | Alexander et al. .......... 277/636 |
| 4,447,066 A | * | 5/1984 | Katagiri et al. ............ 277/636 |
| 4,832,161 A | * | 5/1989 | Weiler et al. ............ 188/73.44 |
| 4,926,979 A | * | 5/1990 | Odaka ..................... 188/73.44 |
| 4,961,480 A | * | 10/1990 | Weiler et al. ............... 277/636 |
| 5,161,651 A | * | 11/1992 | Weiler et al. ............... 277/636 |
| 5,183,136 A | * | 2/1993 | Maeda et al. ............ 188/73.44 |
| 5,261,678 A | * | 11/1993 | Takemori et al. ........... 277/636 |
| 5,299,665 A | * | 4/1994 | Weiler et al. ............... 277/636 |
| 6,039,156 A | * | 3/2000 | Schneider ................ 188/73.44 |
| 6,223,867 B1 | * | 5/2001 | Doi et al. ................ 188/73.44 |

FOREIGN PATENT DOCUMENTS

| JP | 4-88733 | 7/1992 |
| JP | 10-331879 | 12/1998 |

* cited by examiner

*Primary Examiner*—Jack Lavinder
*Assistant Examiner*—Robert A. Siconolfi

(57) ABSTRACT

A protective boot having a bellows portion, a cylindrical portion, a guide-bore-side mounting portion, a thick-walled portion, a thin-walled portion, a pin-side mounting portion and an air passage groove. In an operation for mounting of the protective boot, the pin-side mounting portion is inclined radially inward through the thin-walled portion while being slidably moved along the sliding pin, to thereby effect an escape of air contained in an annular space between the sliding pin and the boot through the air passage groove. The thick-walled portion prevents the pin-side mounting portion from bending radially inward to an undesirable extent. Thus, the operation for mounting of the protective boot can be smoothly conducted.

21 Claims, 16 Drawing Sheets

DISC BRAKE

BACKGROUND OF THE INVENTION

The present invention relates to a disc brake which is advantageously used for imparting a braking force to a vehicle.

In general, a disc brake comprises: a mounting member mounted on a non-rotatable portion of a vehicle; a caliper displaceable in an axial direction of the disc relative to the mounting member and adapted to press friction pads against the disc; guide bores formed in one of the mounting member and the caliper and extending in the axial direction of the disc; sliding pins attached to the other of the mounting member and the caliper and inserted into the guide bores so as to support the caliper in a slidable manner; and protective boots for protecting slide surfaces of the guide bores and the sliding pins (as is disclosed in, for example, Unexamined Japanese Patent Application Public Disclosure Nos. 10-331879 and 11-108089).

A disc brake of the above-mentioned type in the related art is described below, with reference to FIGS. 18 to 20. In the drawings, reference numeral 1 denotes a mounting member integrally attached to a non-rotatable portion of a vehicle. The mounting member 1 includes a pair of arms 1A separated in a circumferential direction of a disc 16 (described later) and extending over an outer periphery of the disc 16 in an axial direction thereof. A pair of friction pads 3 (described later) are adapted to be guided in the axial direction of the disc 16 between the arms 1A.

Reference numeral 2 denotes a caliper slidably supported by the mounting member 1 through sliding pins 7 described later. The caliper 2 comprises a bridge portion 2A extending over the outer periphery of the disc 16 between the arms 1A of the mounting member 1, an inner leg portion 2B provided on an inner side of the bridge portion 2A and having a cylinder bore (not shown) defined by an inner circumferential surface thereof and an outer leg portion 2C provided on an outer side of the bridge portion 2A. Further, pin mounting portions 2D protrude from the inner leg portion 2B in leftward and rightward directions in FIG. 18, with the sliding pins 7 being attached thereto.

The friction pads 3 are positioned at opposite sides of the disc 16 between the arms 1A of the mounting member 1. The friction pads 3 are adapted to be slidably guided in the axial direction of the disc 16 between the arms 1A of the mounting member 1 and pressed against opposite surfaces of the disc 16 by the caliper 2.

Reference numeral 4 denotes a pair of guide bores which are formed in the arms 1A, respectively. Each guide bore 4 is a hole having a bottom and having a circular cross-section, and extends in the axial direction of the disc 16. Each sliding pin 7 is slidably inserted into the guide bore 4 and guided in the axial direction.

Reference numeral 5 denotes a cylindrical protrusion extending from each arm 1A of the mounting member 1 radially outward of the guide bore 4. As shown in FIG. 19, a first boot mounting groove 6 is formed in an outer circumferential surface of the cylindrical protrusion 5. The first boot mounting groove 6 includes side surfaces 6A and 6B and extends along an entire circumference of the cylindrical protrusion 5.

The reference numeral 7 denotes the pair of sliding pins 7. The sliding pins 7 are attached to pin mounting portions 2D of the caliper 2 and each includes a pin shaft portion 7A in a cylindrical form having a generally constant outer diameter. The pin shaft portion 7A has one end thereof slidably inserted into the guide bore 4 and the other end thereof protruding from the guide bore 4. The protruding end of the pin shaft portion 7A is connected to an annular protruding portion 7B protruding in a radially outward direction thereof and a caliper fixed portion 7C in a hexagonal form integrally connected to the annular protruding portion 7B on a side thereof opposite the pin shaft portion 7A.

An outer circumferential surface of the protruded end side of the pin shaft portion 7A includes a second boot mounting groove 8 positioned between the annular protruding portion 7B and the caliper fixed portion 7C and having side surfaces 8A and 8B and also includes a tapering guiding surface 9 extending between an outer circumferential surface of the pin shaft portion 7A and an outer circumferential surface of the annular protruding portion 7B so as to increase a diameter of the sliding pin 7 in a direction from the pin shaft portion 7A to the annular protruding portion 7B. As is described later, the guiding surface 9 is adapted to guide a pin-side mounting portion 15 of a protective boot 11 toward the second boot mounting groove 8. Further, the caliper fixed portion 7C of the sliding pin 7 is fixed to the pin mounting portion 2D of the caliper 2 by means of a pin bolt 10.

Each of the protective boot 11 is adapted to protect slide surfaces of the guide bore 4 and the sliding pin 7. As shown in FIG. 19, the protective boot 11 is formed as a bellowslike cylindrical body made of an elastic material, such as rubber, and disposed so as to enclose the sliding pin 7.

The protective boot 11 comprises a bellows portion 12 in the form of a cylinder enclosing the sliding pin 7 and adapted to extend and contract in the axial direction, a guide-bore-side mounting portion 13 connected to one end of the bellows portion 12 and mounted with an interference fit into the first boot mounting groove 6 of the mounting member 1, and the above-mentioned pin-side mounting portion 15 connected to the other end of the bellows portion 12 through a connecting portion 14 and mounted with an interference fit into the second boot mounting groove 8 of the sliding pin 7. The protective boot 11 provides a seal against entry of a foreign matter such as dust or rain water into an area between slide surfaces of the guide bore 4 and the sliding pin 7.

The disc 16 is adapted to rotate together with a wheel of the vehicle. The friction pads 3 apply a braking force to the disc 16 during a braking operation.

In the above-mentioned disc brake in the related art, a brake fluid is externally supplied to the inner leg portion 2B (cylinder bore) of the caliper 2, to thereby effect a sliding motion of a piston (not shown) in the cylinder bore and press the inner-side friction pad 3 against the disc 16.

In this instance, the caliper 2 receives a reaction force acting in a direction away from an inner side of the disc 16 and the sliding pin 7 integral to the caliper 2 slidably moves in the same direction through the guide bore 4 of the mounting member 1, to thereby enable the caliper 2 to press the outer-side friction pad 3 against the disc 16. Consequently, the disc 16 receives a braking force applied from opposite sides thereof by the friction pads 3.

Next, referring to FIG. 20, a description is made with regard to an operation for mounting of the protective boot 11. First, prior to insertion of the sliding pin 7 into the guide bore 4 of the mounting member 1, the guide-bore-side mounting portion 13 of the protective boot 11 is fitted into the first boot mounting groove 6 of the mounting member 1, to thereby attach the protective boot 11 to the mounting member 1 in a state such that it freely extends from the mounting member 1.

Subsequently, using an automatic mounting apparatus (not shown), the pin shaft portion 7A of the sliding pin 7 is inserted through the pin-side mounting portion 15 of the protective boot 11 into the boot and gradually inserted into the guide bore 4 of the mounting member 1 in a direction indicated by an arrow A.

Consequently, as shown in FIG. 20, the guiding surface 9 of the sliding pin 7 is brought into sliding contact with the pin-side mounting portion 15 of the protective boot 11. When the sliding pin 7 is further inserted into the guide bore 4, the bellows portion 12 of the protective boot 11 is subject to compressive deformation, and air sealably contained in an annular space S between the protective boot 11 and the sliding pin 7 is compressed. In this instance, the pin-side mounting portion 15 slidably moves along the guiding surface 9 toward the second boot mounting groove 8 in a direction indicated by an arrow B. The pin-side mounting portion 15 moves over the annular protruding portion 7B of the sliding pin 7 and is mounted with an interference fit into the second boot mounting groove 8.

In the above-mentioned related art, when the sliding pin 7 is inserted into the guide bore 4 for mounting of the protective boot 11, the pin-side mounting portion 15 of the protective boot 11 is moved over the annular protruding portion 7B of the sliding pin 7 and mounted with an interference fit into the second boot mounting groove 8, under the action of air pressure in the annular space S.

However, the above-mentioned related art is problematic in the following points. When the sliding pin 7 is inserted in the direction A in FIG. 20 into the guide bore 4, the pin-side mounting portion 15 of the protective boot 11, which is made of a material having a large frictional resistance, such as rubber, is dragged by the guiding surface 9 of the sliding pin 7 due to the frictional resistance. In this case, the pin-side mounting portion 15 is likely to bend in a direction indicated by an arrow B' and be wrapped or folded inside the bellows portion 12.

Therefore, in the related art, an operator must temporarily stop the operation of the automatic mounting apparatus and manually pull the pin-side mounting portion 15 out of the bellows portion 12 for appropriate re-attachment of the pin-side mounting portion 15 to the second boot mounting groove 8. Therefore, operations for mounting and replacement of the protective boot 11 become laborious.

Further, the pressure of air sealably contained in the annular space S acts through the protective boot 11 in a direction for pulling the sliding pin 7 out of the guide bore 4. Therefore, if the sliding pin 7 is not held after mounting of the protective boot 11, the sliding pin 7 is likely to protrude from the mounting member 1 in a floating state, under the action of air pressure in the annular space S, and disturbs an operation for mounting of the caliper 2 subsequent to the mounting of the protective boot 11.

The present invention has been made, in view of the above problems accompanying the related art. It is an object of the present invention to provide a disc brake wherein a pin-side mounting portion of a protective boot can be easily attached to a sliding pin and an operation for mounting of the protective boot can be smoothly conducted.

SUMMARY OF THE INVENTION

In order to achieve the above-mentioned object, the present invention provides a disc brake comprising: a mounting member mounted on a non-rotatable portion of a vehicle; a caliper displaceable in an axial direction of the disc relative to the mounting member and adapted to press a pair of friction pads against the disc; a guide bore formed in one member selected from the mounting member and the caliper and extending in the axial direction of the disc; a sliding pin attached to the other member of the mounting member and the caliper and inserted into the guide bore so as to support the caliper in a slidable manner; and a protective boot adapted to protect slide surfaces of the sliding pin and the guide bore. The protective boot comprises: a bellows portion in a cylindrical form enclosing the sliding pin and capable of extending or expanding and contracting in an axial direction of the sliding pin; a guide-bore-side mounting portion connected to one end of the bellows portion and attached to the mounting member or caliper at a position around an open end of the guide bore; a cylindrical portion formed between the guide-bore-side mounting portion and the bellows portion and axially extending around the sliding pin; a thick-walled portion connected to the other end of the bellows portion and having a greater wall thickness than the bellows portion so as to increase stiffness of the protective boot, the thick-walled portion having a radial size substantially equal to a radial size of the cylindrical portion; a thin-walled portion having one end thereof connected to the thick-walled portion on a side thereof opposite the bellows portion and having a smaller wall thickness than the thick-walled portion, the thin-walled portion being capable of bending axially and radially; and a pin-side mounting portion having one end thereof connected to the thin-walled portion on a side thereof opposite the thick-walled portion and attached with an interference fit to an outer circumferential surface of the sliding pin.

By this arrangement, when an end portion of the protective boot bends radially inward due to frictional resistance imparted to the pin-side mounting portion, the thick-walled portion having high stiffness abuts against the pin-side mounting portion through the thin-walled portion, to thereby prevent the pin-side mounting portion from bending to an undesirable extent and being wrapped inside the bellows portion. Further, the cylindrical portion and the thick-walled portion have substantially the same radial size. Therefore, the protective boot as a whole can be obtained in a generally cylindrical form extending along a predetermined cylindrical surface. The bellows portion can be smoothly extended and contracted along the cylindrical surface.

Consequently, it is possible to suppress radial buckling of the bellows portion when it is subject to compressive deformation, and a restoring force of the bellows portion can be stably applied to the pin-side mounting portion through the thick-walled portion.

In one embodiment of the present invention, an outer circumferential surface of the mounting member or caliper at a position around the guide bore may include a first boot mounting groove into which the guide-bore-side mounting portion of the protective boot is fitted and the outer circumferential surface of the sliding pin includes a second boot mounting groove into which the pin-side mounting portion of the protective boot is fitted. A length ($L_1$) between the guide-bore-side mounting portion and the pin-side mounting portion as measured when the bellows portion of the protective boot is axially compressed to a large extent may be greater than a length ($L_2$) between the first boot mounting groove and the second boot mounting groove as measured when the sliding pin is inserted to a maximum depth into the guide bore.

By this arrangement, when the sliding pin is inserted to a maximum depth into the guide bore, the length ($L_1$) between the mounting portions when the protective boot is compressed to a large extent becomes greater than the length ($L_2$) between the first and second boot mounting grooves. Therefore, the pin-side mounting portion can be reliably fitted into the second boot mounting groove.

In another embodiment of the present invention, the outer circumferential surface of the sliding pin may include a boot guiding portion for guiding the pin-side mounting portion of the protective boot in a direction from the guide bore to the second boot mounting groove.

By this arrangement, when the sliding pin is inserted into the guide bore, the pin-side mounting portion of the protective boot can be guided into the second boot mounting groove while being slidably moved along the boot guiding portion.

In a further embodiment of the present invention, the pin-side mounting portion may include a communication passage. The communication passage is adapted to bring a space formed between the protective boot and the sliding pin into communication with the outside, during mounting of the protective boot on the outer circumferential surface of the sliding pin.

By this arrangement, when the pin-side mounting portion of the protective boot is brought into sliding contact with the outer circumferential surface of the sliding pin during mounting of the protective boot, the pin-side mounting portion is inclined radially inward through the thin-walled portion due to the effect of frictional resistance relative to the sliding pin, and the communication passage of the pin-side mounting portion is positioned such that it is open to an annular space formed between the sliding pin and the protective boot. Consequently, the air which is compressed in the annular space during insertion of the sliding pin can be discharged through the communication passage to the outside.

The present invention also provides a disc brake comprising: a mounting member mounted on a non-rotatable portion of a vehicle; a caliper displaceable in an axial direction of the disc relative to the mounting member and adapted to press a pair of friction pads against the disc; a guide bore formed in one member selected from the mounting member and the caliper and extending in the axial direction of the disc; a sliding pin attached to the other member of the mounting member and the caliper and inserted into the guide bore so as to support the caliper in a slidable manner; and a protective boot adapted to protect slide surfaces of the sliding pin and the guide bore. The protective boot comprises: a bellows portion in a cylindrical form enclosing the sliding pin and capable of extending or expanding and contracting in an axial direction of the sliding pin; a guide-bore-side mounting portion connected to one end of the bellows portion and attached to the mounting member or caliper at a position around an open end of the guide bore; a thick-walled portion connected to the other end of the bellows portion and having a greater wall thickness than the bellows portion so as to increase stiffness of the protective boot; a thin-walled portion having one end thereof connected to the thick-walled portion on a side thereof opposite the bellows portion and having a smaller wall thickness than the thick-walled portion, the thin-walled portion being capable of bending axially and radially; and a pin-side mounting portion having one end thereof connected to the thin-walled portion on a side thereof opposite the thick-walled portion and attached with an interference fit to an outer circumferential surface of the sliding pin. An outer circumferential surface of the mounting member or caliper at a position around the guide bore includes a first boot mounting groove into which the guide-bore-side mounting portion of the protective boot is fitted and the outer circumferential surface of the sliding pin includes a second boot mounting groove into which the pin-side mounting portion of the protective boot is fitted. A length ($L_1$) between the guide-bore-side mounting portion and the pin-side mounting portion as measured when the bellows portion of the protective boot is axially compressed to a large extent is greater than a length ($L_2$) between the first boot mounting groove and the second boot mounting groove as measured when the sliding pin is inserted to a maximum depth into the guide bore.

By this arrangement, when an end portion of the protective boot bends radially inward due to frictional resistance imparted to the pin-side mounting portion, the thick-walled portion having high stiffness abuts against the pin-side mounting portion through the thin-walled portion, to thereby prevent the pin-side mounting portion from bending to an undesirable extent and being wrapped inside the bellows portion. Further, when the sliding pin is inserted to a maximum depth into the guide bore, the length ($L_1$) between the mounting portions when the protective boot is compressed to a large extent becomes greater than the length ($L_2$) between the first and second boot mounting grooves. Therefore, the pin-side mounting portion can be reliably fitted into the second boot mounting groove.

In one embodiment of the present invention, the outer circumferential surface of the sliding pin may include a boot guiding portion for guiding the pin-side mounting portion of the protective boot in a direction from the guide bore to the second boot mounting groove.

By this arrangement, when the sliding pin is inserted into the guide bore, the pin-side mounting portion of the protective boot can be guided into the second boot mounting groove while being slidably moved along the boot guiding portion.

In another embodiment of the present invention, the pin-side mounting portion may include a communication passage. The communication passage is adapted to bring a space formed between the protective boot and the sliding pin into communication with the outside, during mounting of the protective boot on the outer circumferential surface of the sliding pin.

By this arrangement, when the pin-side mounting portion of the protective boot is brought into sliding contact with the outer circumferential surface of the sliding pin during mounting of the protective boot, the pin-side mounting portion is inclined radially inward through the thin-walled portion due to the effect of frictional resistance relative to the sliding pin, and the communication passage of the pin-side mounting portion is positioned such that it is open to an annular space formed between the sliding pin and the protective boot. Consequently, the air which is compressed in the annular space during insertion of the sliding pin can be discharged through the communication passage to the outside.

The present invention further provides a disc brake comprising: a mounting member mounted on a non-rotatable portion of a vehicle; a caliper displaceable in an axial direction of the disc relative to the mounting member and adapted to press a pair of friction pads against the disc; a guide bore formed in one member selected from the mounting member and the caliper and extending in the axial direction of the disc; a sliding pin attached to the other member of the mounting member and the caliper and inserted into the guide bore so as to support the caliper in a slidable manner; and a protective boot adapted to protect slide surfaces of the sliding pin and the guide bore. The protective boot comprises: a bellows portion in a cylindrical form enclosing the sliding pin and capable of extending or expanding and contracting in an axial direction of the sliding pin; a guide-bore-side mounting portion connected to one end of the bellows portion and attached to the mounting member or caliper at a position around an open end of the guide bore; and a pin-side mounting portion connected to the other end of the bellows portion through a cylindrical connecting portion and attached with an interference fit to an outer circumferential surface of the sliding pin. The cylindrical connecting portion between the bellows portion and the pin-side mounting portion includes a reinforcing rib, which is formed along a part of an entire circumferential length of the cylindrical connecting portion, so as to suppress bending of the pin-side mounting portion toward a radially inner side of the connecting portion during mounting of the protective boot on the outer circumferential surface of the sliding pin.

By this arrangement, for mounting of the protective boot, the pin-side mounting portion is slidably moved along the outer circumferential surface of the sliding pin and attached with an interference fit to a mounting portion, such as a groove formed in the outer circumferential surface of the sliding pin. In this instance, the reinforcing rib prevents the pin-side mounting portion from bending toward a radially inner side of the connecting portion due to the effect of frictional resistance relative to the sliding pin and being wrapped inside the connecting portion.

In one embodiment of the present invention, the disc brake further may comprise a plurality of reinforcing ribs arranged in a spaced relationship in a circumferential direction of the protective boot.

By this arrangement, stiffness of the connecting portion can be increased at a plurality of positions in the circumferential direction.

In another embodiment of the present invention, the plurality of reinforcing ribs are arranged in a substantially equally spaced relationship in the circumferential direction of the protective boot.

By this arrangement, stiffness of the connecting portion can be increased uniformly in the circumferential direction.

In a further embodiment of the present invention, the pin-side mounting portion of the protective boot may include a communication passage for enabling air contained in a space formed between the protective boot and the sliding pin to be discharged to the outside during mounting of the protective boot on the outer circumferential surface of the sliding pin.

In this arrangement, during mounting of the protective boot, the connecting portion is subject to elastic deformation due to the frictional resistance generated between the pin-side mounting portion and the sliding pin, so that the pin-side mounting portion can be radially inclined through the connecting portion. Consequently, the communication passage can be positioned such that it is open to the annular space formed between the sliding pin and the protective boot. When the protective boot is compressed during mounting thereof, the air contained in the annular space can be discharged through the communication passage to the outside.

In a further embodiment of the present invention, the communication passage may be formed at a position different from position(s) of the reinforcing rib(s) with respect to the circumferential direction of the protective boot.

In this arrangement, a portion of the connecting portion of the protective boot, in which no reinforcing rib is formed, has flexibility, so that the communication passage can be disposed at a circumferential position corresponding to the flexible portion. Consequently, during mounting of the protective boot, the pin-side mounting portion can be smoothly inclined to a radially inner side thereof at the position in which the communication passage is formed, and the communication passage can be stably positioned such that it is open to the annular space inside the protective boot.

In the present invention, a space between the reinforcing ribs which circumferentially overlaps the communication passage may have a greater circumferential length than a space between the reinforcing ribs which does not overlap the communication passage.

By this arrangement, high flexibility can be imparted to a portion between the reinforcing ribs, which is located at a position corresponding to the communication passage, thereby further improving the performance of the communication passage to effect an escape of air.

DETAILED DESCRIPTION OF THE INVENTION

Figure 1:
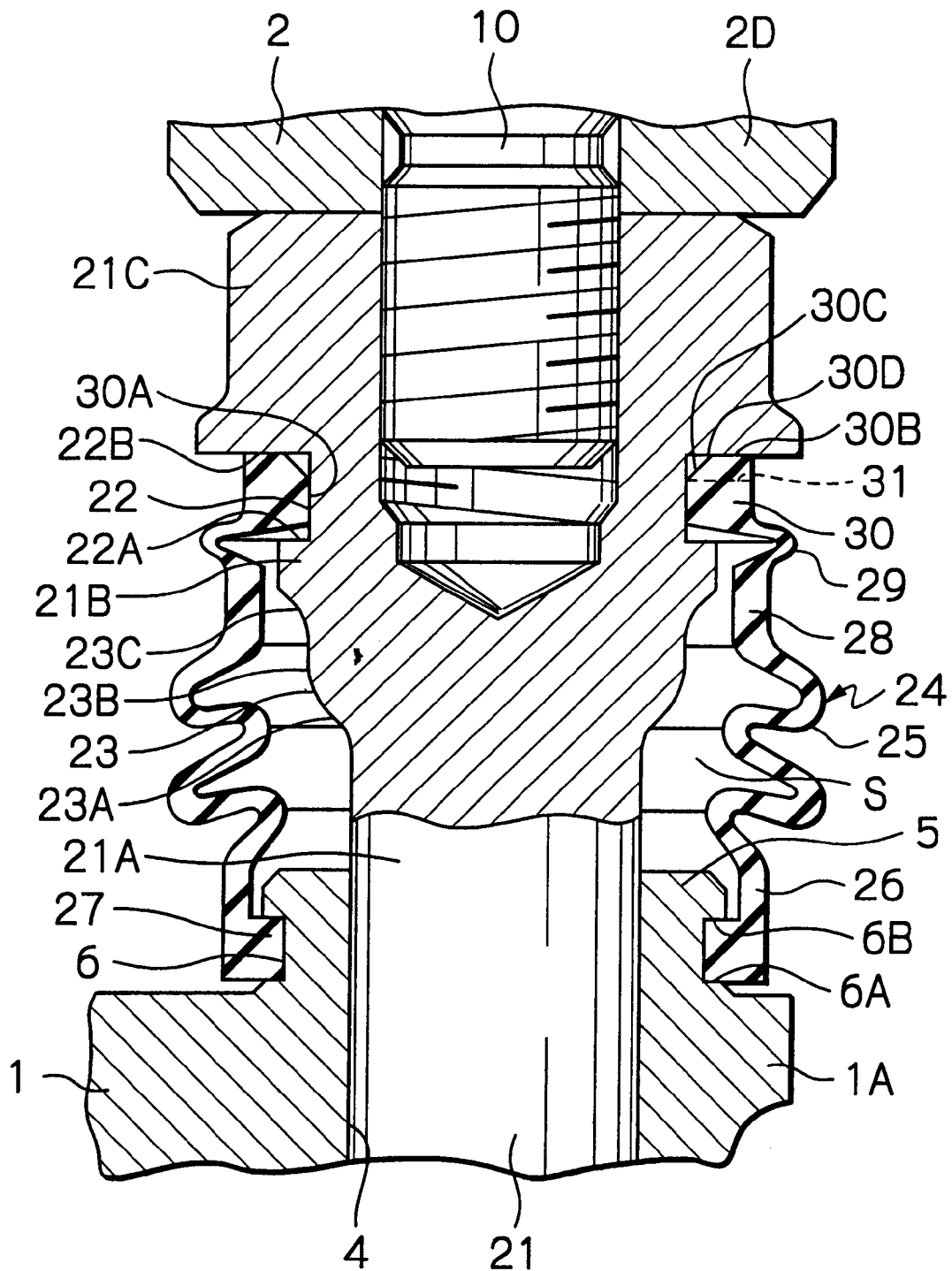
FIG. 1 is an enlarged cross-sectional view showing a sliding pin and a protective boot of a disc brake in a first embodiment of the present invention.

Hereinbelow, referring to the accompanying drawings, a detailed description is made with regard to a disc brake according to a first embodiment of the present invention. In the first embodiment, elements which are the same as those of the disc brake in the above-mentioned related art are designated by the same reference numerals and characters, and explanation thereof is omitted.

Reference numeral 21 denotes a sliding pin of the disc brake in the first embodiment. The sliding pin 21 is arranged in substantially the same manner as the sliding pin 7 in the related art. It comprises a pin shaft portion 21A having one end thereof slidably inserted into the guide bore 4 of the mounting member 1 and the other end thereof protruding from the guide bore 4. The protruding end of the pin shaft portion 21A is connected to an annular protruding portion 21B protruding in a radially outward direction thereof and a caliper fixed portion 21C in a hexagonal form is integrally connected to the annular protruding portion 21B on a side thereof opposite the pin shaft portion 21A. The caliper fixed portion 21C is fixed to the pin mounting portion 2D of the caliper 2 by means of the pin bolt 10.

An outer circumferential surface the protruding end side of the pin shaft portion 21A includes a second boot mounting groove 22 positioned between the annular protruding portion 21B and the caliper fixed portion 21C and having side surfaces 22A and 22B, and also includes a boot guiding portion 23 which is described below.

The boot guiding portion 23 is formed at the pin shaft portion 21A of the sliding pin 21 so as to expand in a stepwise manner to increase the diameter of the sliding pin. The boot guiding portion 23 comprises a first guiding surface portion 23A, an even surface portion 23B and a second guiding surface portion 23C. The first guiding surface portion 23A is in a tapering form and extends from the outer circumferential surface of the pin shaft portion 21A in such a manner as to gradually increase the diameter of the sliding pin. The even surface portion 23B is in a cylindrical form connected to the first guiding surface portion 23A on a side thereof opposite the pin shaft portion 21A, and extends substantially in parallel to the outer circumferential surface of the pin shaft portion 21A. The second guiding surface portion 23C is in a tapering form connected to the even surface portion 23B, and extends toward an outer circumferential surface of the annular protruding portion 21B in such a manner as to gradually increase the diameter of the sliding pin. The boot guiding portion 23 is adapted to guide a pin-side mounting portion 30 of a protective boot 24 (described later) to the second boot mounting groove 22, while increasing the diameter of the pin-side mounting portion 30 in two steps.

Figure 2:
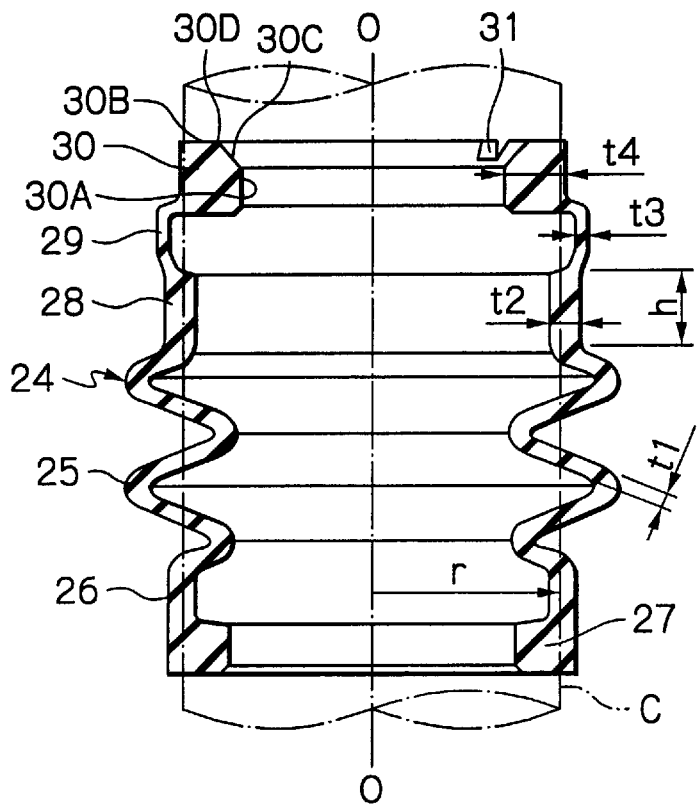
FIG. 2 is a cross-sectional view of the protective boot shown in FIG. 1, wherein the protective boot is in a freely extended position.
Figure 3:
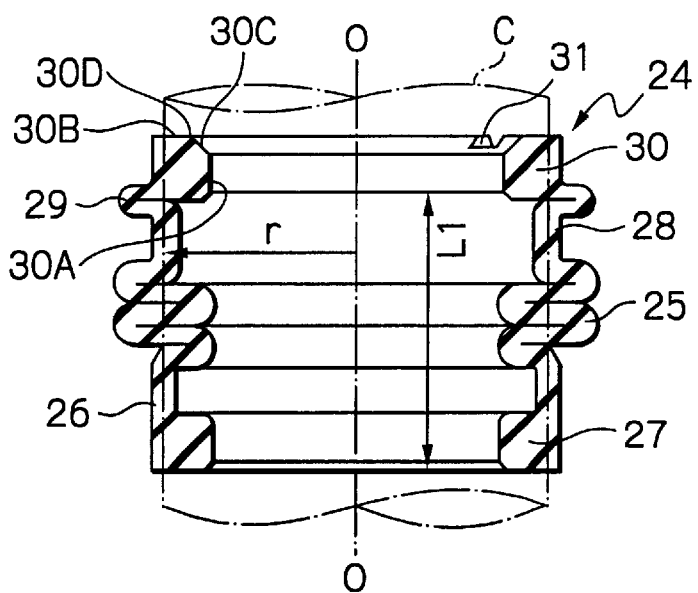
FIG. 3 is a cross-sectional view of the protective boot, wherein a bellows portion is compressed to a generally maximum deformed position.

The protective boot 24 is formed as a bellowslike cylindrical body made of an elastic material, such as rubber. As shown in FIGS. 1 to 3, the protective boot 24 comprises a bellows portion 25, a cylindrical portion 26, a guide-bore-side mounting portion 27, a thick-walled portion 28, a thin-walled portion 29 and the above-mentioned pin-side mounting portion 30. The protective boot 24 is disposed so as to enclose the sliding pin 21.

The bellows portion 25 provides an intermediate portion of the protective boot 24. The bellows portion 25 comprises a cylindrical body having a radial wall thickness $t_1$. The bellows portion 25 is capable of axial extension and contraction between a state in which the bellows portion 25 freely extends as shown in FIG. 2 and a state in which the bellows portion 25 is subject to substantially maximum compressive deformation as shown in FIG. 3.

The cylindrical portion 26 is connected to one end of the bellows portion 25. As shown in FIG. 2, the cylindrical portion 26 axially extends and has a predetermined radial size $r$ substantially equal to the radial size of the thick-walled portion 28 described later.

The guide-bore-side mounting portion 27 is connected to one end of the cylindrical portion 26. The guide-bore-side mounting portion 27 comprises a thick-walled ring having a generally rectangular cross-section. The guide-bore-side mounting portion 27 is mounted with an interference fit into the first boot mounting groove 6 of the mounting member 1.

The thick-walled portion 28 is connected to the other end of the bellows portion 25. As shown in FIGS. 2 and 3, the thick-walled portion 28 comprises a thick-walled cylindrical body having an axial length h and a radial wall thickness $t_2$. The wall thickness $t_2$ of the thick-walled portion 28 is made greater than the wall thickness $t_1$ of the bellows portion 25 ($t_2 > t_1$). The ratio of the wall thickness $t_2$ to the length $h$ ($t_2/h$) is preliminarily set to, for example, 0.3 or more so as to impart sufficient stiffness to the thick-walled portion 28.

The thick-walled portion 28 reinforces an end portion of the protective boot 24 including the pin-side mounting portion 30 so as to increase the stiffness of the end portion. Further, In an operation for mounting of the protective boot 24, the thick-walled portion 28 abuts against the pin-side mounting portion 30, to thereby prevent the pin-side mounting portion 30 from bending radially inward to a large extent and being wrapped or folded inside the bellows portion.

Further, the thick-walled portion 28 has the predetermined radial size $r$ substantially equal to the radial size of the cylindrical portion 26. The protective boot 24 as a whole including the cylindrical portion 26 and the thick-walled portion 28 is formed along a cylindrical surface C, which surface defines a cylinder having a center axis coincident with an axis O-O of the sliding pin 21. The cylindrical portion 26 and the thick-walled portion 28 are adapted to be held in tandem along the cylindrical surface C, even when the bellows portion 25 is subject to compressive deformation.

Figure 5:
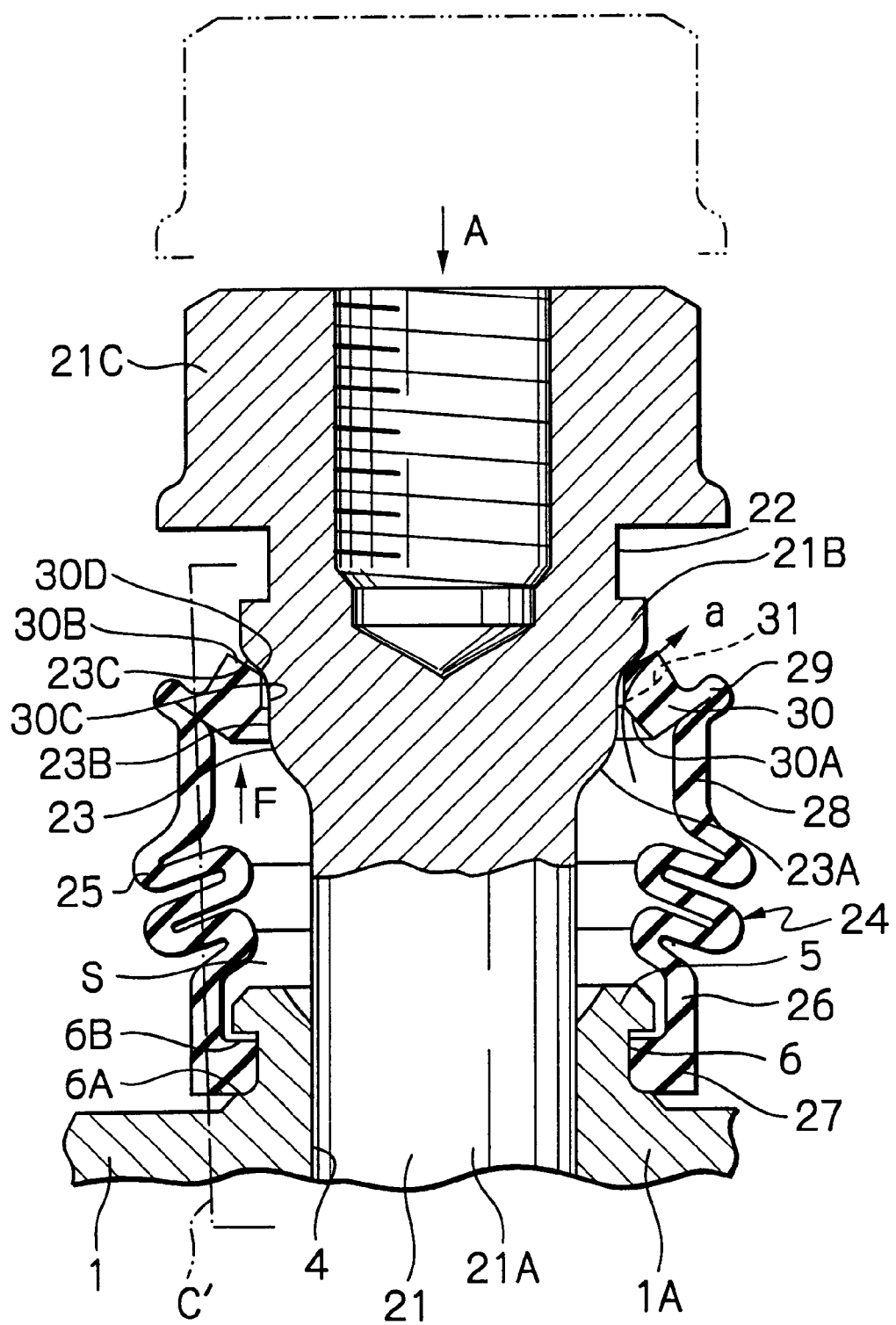
FIG. 5 is an enlarged cross-sectional view showing a state in which a pin-side mounting portion of the protective boot slidably moves along a boot guiding portion of the sliding pin.

The thin-walled portion 29 has one end thereof connected to the thick-walled portion 28 on a side thereof opposite the bellows portion 25. As shown in FIG. 2, the thin-walled portion 29 has a radial wall thickness $t_3$ made smaller than the wall thickness $t_2$ of the thick-walled portion 28 and a thickness $t_4$ of the pin-side mounting portion 30 (described later) ($t_3<t_2<t_4$). The radial size of the thin-walled portion 29 is made larger than the radial size $r$ of the thick-walled portion 28 and a transitional portion between the thick-walled portion 28 and the thin-walled portion 29 is curved. In an operation for mounting of the protective boot 24, as shown in FIG. 5 described later, the thin-walled portion 29 is bent both axially and radially, to thereby enable the pin-side mounting portion 30 in an inclined state to be brought into sliding contact with the boot guiding portion 23 of the sliding pin 21.

The pin-side mounting portion 30 has one end thereof connected to the thin-walled portion 29 on a side thereof opposite the thick-walled portion 28. The pin-side mounting portion 30 comprises a thick-walled ring having a generally rectangular cross-section as in the case of the guide-bore-side portion 27, and has the above-mentioned radial thickness $t_4$. An inner diameter of the pin-side mounting portion 30 is made smaller than an outer diameter of the sliding pin 21 at the second boot mounting groove 22, and the pin-side mounting portion 30 is mounted with an interference fit into the second boot mounting groove 22.

An annular inclined surface 30C is formed between an inner circumferential surface 30A and an end face 30B of the pin-side mounting portion 30. The inclined surface 30C is inclined so as to increase the inner diameter of the pin-side mounting portion 30 in a direction from the inner circumferential surface 30A toward the end face 30B. An angular corner portion 30D is annularly formed between the inclined surface 30C and the end face 30B.

Figure 6:
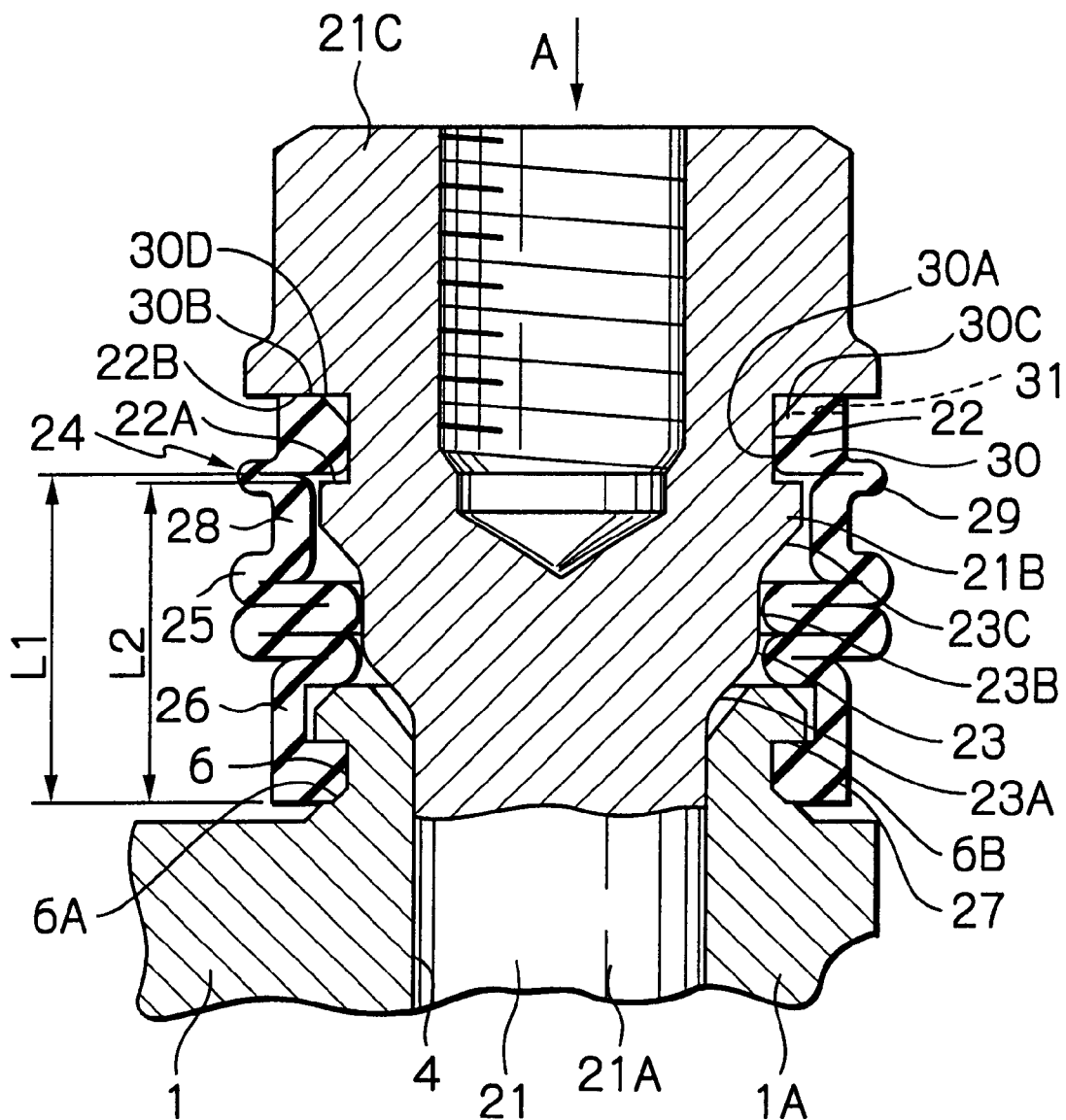
FIG. 6 is an enlarged cross-sectional view showing a state in which the pin-side mounting portion of the protective boot is fitted into a second boot mounting groove of the sliding pin.
Figure 7:
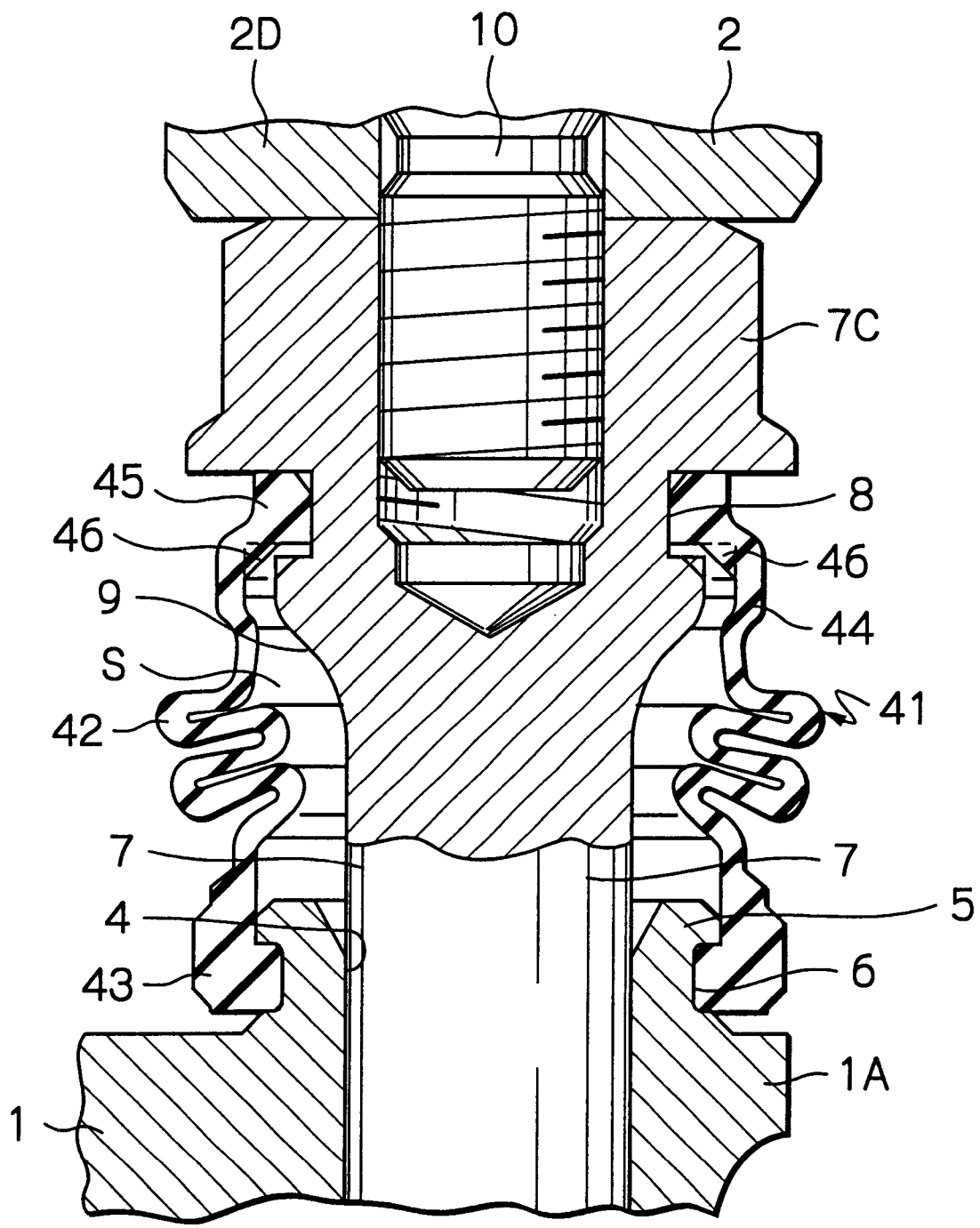
FIG. 7 is an enlarged cross-sectional view showing a sliding pin and a protective boot of a disc brake in a second embodiment of the present invention.

As shown in FIGS. 3 and 6, an axial length $L_1$ as a distance between a side surface (an end face) of the guide-bore-side portion 27 and a side face of the pin-side mounting portion 30 as measured when the bellows portion 25 is compressed to a generally maximum deformed position is set to be greater than an axial length $L_2$ between the side surface 6A of the first boot mounting groove 6 and the side surface 22A of the second boot mounting groove 22 as measured when the sliding pin 21 is inserted to a maximum depth into the guide bore 4, as described later ($L_1>L_2$).

Reference numeral 31 denotes an air passage groove as a communication passage formed in the end face 30B of the pin-side mounting portion 30. As shown in FIGS. 2 and 5, the air passage groove 31 is in the form of a groove radially extending through the end face 30B. A radially inner portion of the air passage groove 31 opens to a radially inner side of the pin-side mounting portion 30 at the inclined surface 30C. A radially outer portion of the air passage groove 31 opens to a radially outer side of the pin-side mounting portion 30.

In an operation for mounting of the protective boot 24, when the pin-side mounting portion 30 in an inclined state slidably moves along the boot guiding portion 23 of the sliding pin 21, the air passage groove 31 allows communication between the radially inner side and the radially outer side of the pin-side mounting portion 30, thus allowing an escape of air contained in the annular space S between the sliding pin 21 and the protective boot 24 to the outside.

The disc brake in the first embodiment is arranged in the above-mentioned manner. With respect to a basic operation of the disc brake, there is no noteworthy difference between the first embodiment and the related art.

Figure 4:
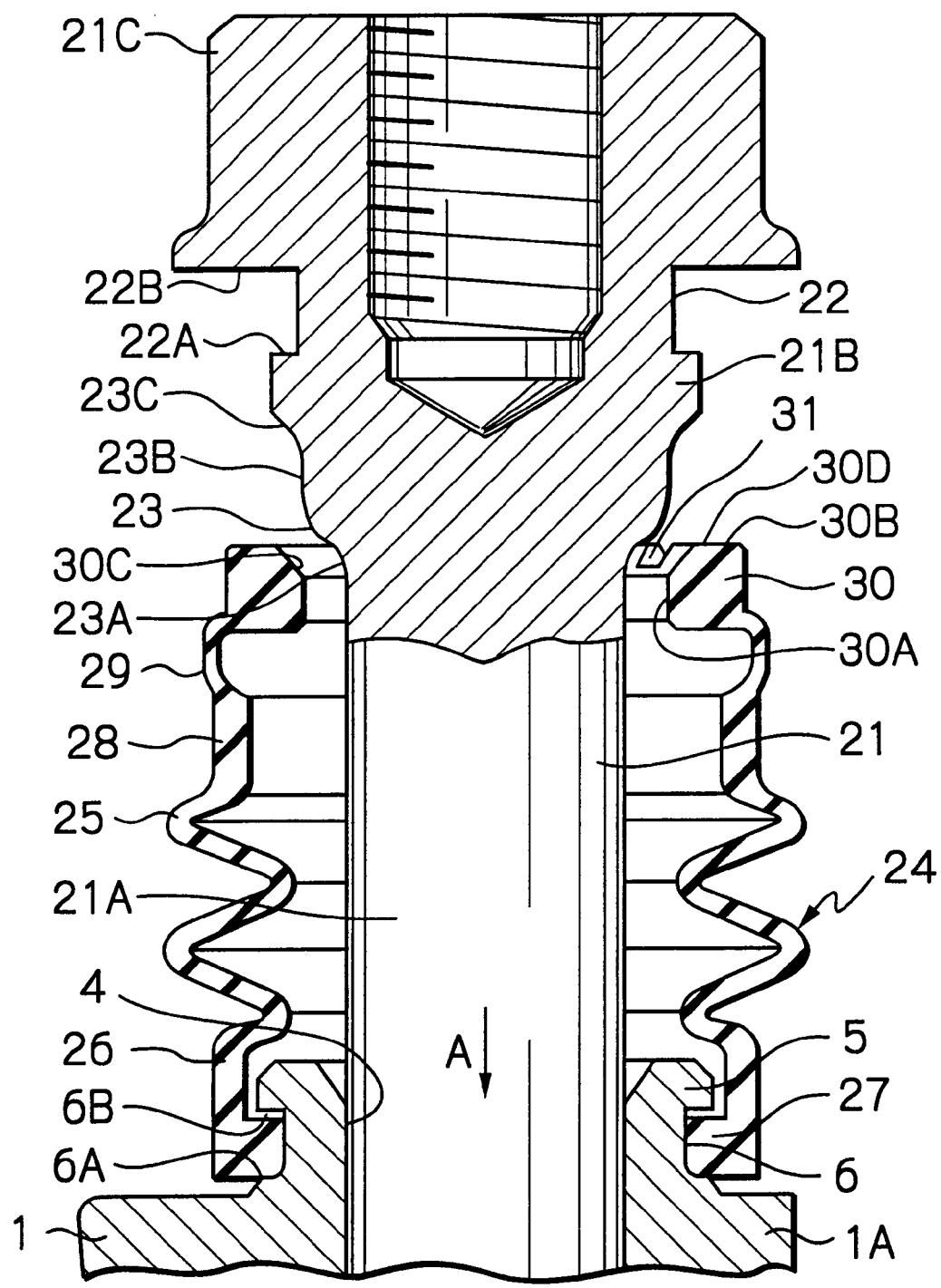
FIG. 4 is an enlarged cross-sectional view showing a state in which a guide-bore-side mounting portion of the protective boot is fitted into a first boot mounting groove of the mounting member in an operation for mounting of the boot.

Next, referring to FIGS. 4 to 6, a description is made with regard to an operation for mounting of the protective boot 24.

First, prior to insertion of the sliding pin 21 into the guide bore 4 of the mounting member 1, the guide-bore-side portion 27 of the protective boot 24 is fitted into the first boot mounting groove 6 of the mounting member 1. Thus, as shown in FIG. 4, the protective boot 24 is attached to the arm 1A of the mounting member 1 and is freely extendable in a cylindrical form. Subsequently, using, for example, an automatic mounting apparatus (not shown), the pin shaft portion 21A of the sliding pin 21 is inserted into the protective boot 24 and gradually inserted in the direction A into the guide bore 4 of the mounting member 1. Then, as shown in FIG. 5, the boot guiding portion 23 of the sliding pin 21 is brought into sliding contact with the pin-side mounting portion 30 of the protective boot 24 and provides frictional resistance to the pin-side mounting portion 30.

Consequently, the thin-walled portion 29 of the protective boot 24 is bent and the pin-side mounting portion 30 is inclined with respect to an axial direction thereof. The air passage groove 31 is positioned such that it is open to the annular space S, so that the air contained in the annular space S is discharged through the air passage groove 31 to the outside as indicated by an arrow $a$.

The thick-walled portion 28 abuts against the inclined pin-side mounting portion 30, to thereby prevent the pin-side mounting portion 30 from bending radially inward to an undesirable extent. In this case, the cylindrical portion 26 and the thick-walled portion 28 remain in the position in which they are axially arranged along a cylindrical surface C', which surface generally corresponds to the cylindrical surface C (see FIG. 2) when the protective boot is in a freely extended position. Therefore, a restoring force F of the bellows portion 25 is axially applied through the thick-walled portion 28 to the pin-side mounting portion 30, and the pin-side mounting portion 30 is forcibly moved toward the second boot mounting groove 22.

When the sliding pin 21 is further inserted into the guide bore 4, the pin-side mounting portion 30 is guided along the guiding surfaces 23A and 23C of the boot guiding portion 23, moved over the annular protruding portion 21B and mounted with an interference fit into the second boot mounting groove 22.

In this instance, as shown in FIG. 6, when the sliding pin 21 is inserted to a maximum depth into the guide bore 4 by abutting the boot guiding portion 23 (the guiding surface portion 23A) of the sliding pin 21 against the open end of the guide bore 4, the axial length $L_1$ between the guide-bore-side mounting portion 27 and the pin-side mounting portion 30 when the protective boot 24 is compressed to a generally maximum deformed position is greater than the axial length $L_2$ between the first boot mounting groove 6 and the second boot mounting groove 22. Therefore, the pin-side mounting portion 30 can be slidably moved to an axial position corresponding to the second boot mounting groove 22 and reliably fitted into the second boot mounting groove 22.

When the pin-side mounting portion 30 is fitted into the second boot mounting groove 22, the inner circumferential surface 30A abuts against the surface of the second boot mounting groove 22 and the air passage groove 31 is disposed outside the annular space S. Therefore, the slide surfaces of the sliding pin 21 and the guide bore 4 can be reliably sealed by the protective boot 24.

Thus, according to the first embodiment of the present invention, the protective boot 24 comprises the bellows portion 25, the cylindrical portion 26, the guide-bore-side mounting portion 27, the thick-walled portion 28, the thin-walled portion 29, the pin-side mounting portion 30 and the air passage groove 31 formed in the pin-side mounting portion 30. Therefore, for mounting of the protective boot, when the pin-side mounting portion 30 slidably moves along the boot guiding portion 23 of the sliding pin 21, the thin-walled portion 29 can be bent so as to incline the pin-side mounting portion 30, to thereby discharge the air in the annular space S to the outside through the air passage groove 31 of the inclined pin-side mounting portion 30. This enables a smooth operation for insertion of the sliding pin 21.

Further, the thick-walled portion 28 surely prevents the end portion of the protective boot 24 from bending radially to an undesirable extent and being wrapped or folded inside the bellows portion. The pin-side mounting portion 30 can be slidably moved smoothly toward the second boot mounting groove 22 of the sliding pin 21.

Further, because the air passage groove 31 is formed in the inclined surface 30C, the annular space S can be sealed after mounting of the protective boot 24. Therefore, the slide surfaces of the sliding pin 21 and the guide bore 4 can be reliably sealed by the protective boot 24. Further, after mounting of the protective boot 24, because the air in the annular space S has been discharged through the air passage groove 31, it is possible to prevent the sliding pin 21 from protruding from the guide bore 4 under the action of air pressure, thus ensuring a smooth operation for mounting of the caliper 2 after mounting of the protective boot.

Thus, in the first embodiment, the pin-side mounting portion 30 of the protective boot 24 can be easily fitted into the second boot mounting groove 22 of the sliding pin 21 and a smooth operation for mounting of the protective boot 24 can be ensured.

Because the cylindrical portion 26 and the thick-walled portion 28 have substantially the same radial size r, the cylindrical portion 26 and the thick-walled portion 28 can be held in the position in which they are arranged along the cylindrical surface C during extension or contraction of the bellows portion 25. Therefore, it is possible to suppress radial buckling of the bellows portion 25 when it is subject to compressive deformation and enable smooth extension and contraction of the bellows portion 25 along the cylindrical surface C. Consequently, the restoring force F of the bellows portion 25 can be stably applied to the pin-side mounting portion 30 through the thick-walled portion 28, so that the pin-side mounting portion 30 can be surely moved toward the second boot mounting groove 22.

The outer circumferential surface of the sliding pin 21 includes the boot guiding portion 23 having the guiding surfaces 23A and 23C in a tapering form. Therefore, when the sliding pin 21 is inserted into the guide bore 4, the pin-side mounting portion 30 of the protective boot 24 can be smoothly guided into the second boot mounting groove 22 while it is slidably moved along the boot guiding portion 23.

In the first embodiment, with respect to the mounting member 1 and the caliper 2, the guide bore 4 is formed in the mounting member 1 and the sliding pin 21 is connected to the caliper 2. However, the present invention is not limited to this embodiment. An arrangement may be made by connecting the sliding pin to the mounting member and forming the guide bore in the caliper.

FIGS. 7 to 11 show a second embodiment of the present invention. In the second embodiment, elements which are the same as those of the disc brake in the related art are designated by the same reference numerals and characters, and explanation thereof is omitted.

Reference numeral 41 denotes a protective boot of a disc brake in the second embodiment. The protective boot 41 comprises an integral, bellowslike cylindrical body made of an elastic material, such as rubber, and includes a bellows portion 42, a guide-bore-side mounting portion 43, a connecting portion 44, a pin-side mounting portion 45, reinforcing ribs 46, etc which are described later. The protective boot 41 is disposed so as to enclose the sliding pin 7 and adapted to protect the slide surfaces of the guide bore 4 of the mounting member 1 and the sliding pin 7 from damage imparted by external dust or rain water.

The bellows portion 42 is in a cylindrical form and provides a longitudinally intermediate portion of the protective boot 41. As in the case of the related art, the bellows portion 42 encloses the sliding pin 7 and is capable of axial extension and contraction.

The guide-bore-side mounting portion 43 is connected to one end of the bellows portion 42. The guide-bore-side mounting portion 43 comprises a thick-walled ring having a generally rectangular cross-section and is mounted with an interference fit into the first boot mounting groove 6 of the mounting member 1.

Figure 8:
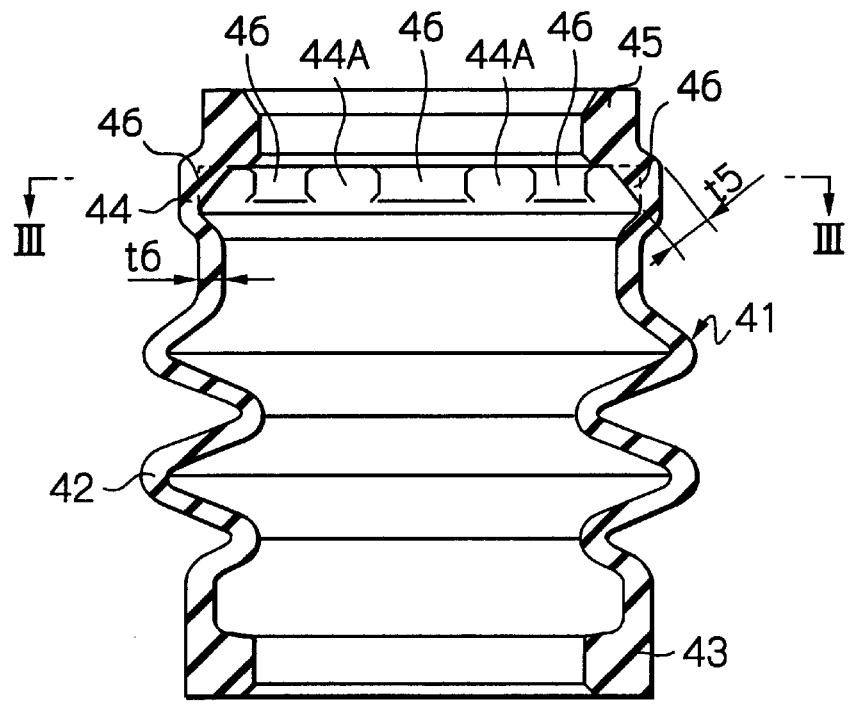
FIG. 8 is a vertical cross-sectional view of the protective boot shown in FIG. 7, wherein the protective boot is in a freely extended position.
Figure 9:
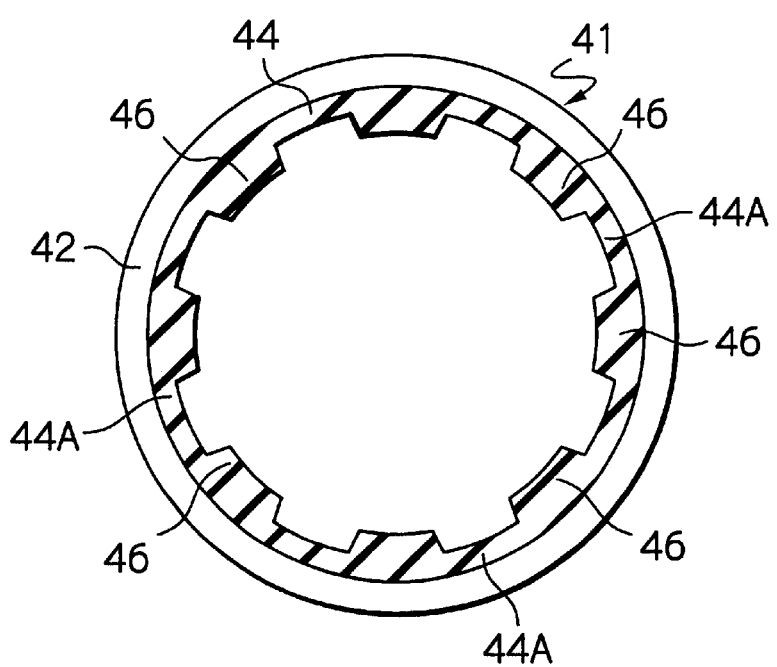
FIG. 9 is a view in transverse section of the protective boot, taken along the line III—III in FIG. 8.

The connecting portion 44 is connected to the other end of the bellows portion 42. As shown in FIGS. 8 and 9, the connecting portion 44 comprises a thin-walled cylindrical body which connects the bellows portion 42 to the pin-side mounting portion 45. The reinforcing ribs 46 are arranged in a circumferentially spaced relationship between the pin-side mounting portion 45 and the connecting portion 44 on a side thereof opposite the bellows portion 42. Further, of an entire circumferential portion of the connecting portion 44, the portions between the reinforcing ribs 46 provide a plurality of circumferential wall portions 44A having higher flexibility than the portions in which the reinforcing ribs 46 are formed.

Figure 11:
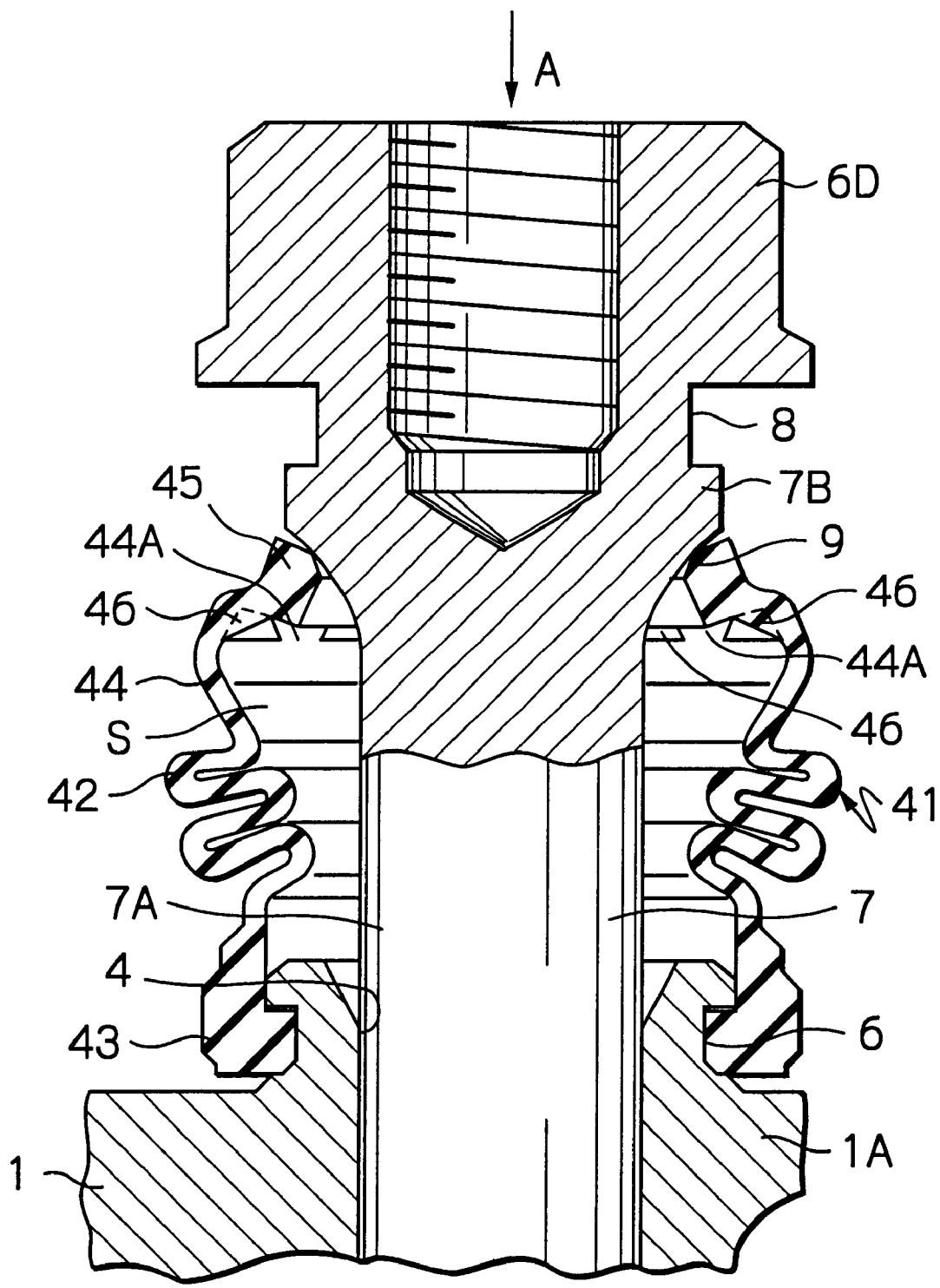
FIG. 11 is an enlarged cross-sectional view showing a state in which a pin-side mounting portion of the protective boot slidably moves along a guiding surface of the sliding pin.

In an operation for mounting of the protective boot 41, as shown in FIG. 11, the connecting portion 44 is bent axially and radially, so that the pin-side mounting portion 45 is inclined with respect to an axial direction thereof. In this state, the pin-side mounting portion 45 is brought into sliding contact with the guiding surface 9 of the sliding pin 7.

The pin-side mounting portion 45 is connected to the other end of the bellows portion 42 through the connecting portion 44. The pin-side mounting portion 45 comprises a thick-walled ring having a generally rectangular cross-section as in the case of the guide-bore-side mounting portion 43. An inner diameter of the pin-side mounting portion 45 is made slightly smaller than an outer diameter of the sliding pin 7 at the second boot mounting groove 8 and the pin-side mounting portion 45 is mounted with an interference fit into the second boot mounting groove 8.

The reinforcing ribs 46 are formed between the connecting portion 44 and the pin-side mounting portion 45 of the protective boot 41. As shown in FIGS. 8 and 9, each reinforcing rib 46 is formed as a protrusion having a generally triangular cross-section on an inner circumferential surface of the connecting portion 44, and circumferentially extends in an arcuate form. The reinforcing ribs 46 are integrally connected to an end face of the pin-side mounting portion 45.

The reinforcing ribs 46 are arranged in a substantially equally spaced relationship in a circumferential direction of the connecting portion. The portions between the reinforcing ribs provide the circumferential wall portions 44A. In this case, as shown in FIG. 8, a wall thickness $t_5$ of the connecting portion 44 including the reinforcing ribs 46 is set to, for example, about 1 to 2 mm. The wall thickness $t_5$ is 1.2 to 3 times as large as a wall thickness $t_6$ of the circumferential wall portions 44A.

The reinforcing ribs 46 serve to increase the stiffness of an end portion of the protective boot 41 including the pin-side mounting portion 45. In an operation for mounting of the protective boot 41, the reinforcing ribs 46 prevent the pin-side mounting portion 45 from bending toward a radially inner side of the connecting portion 44 due to frictional resistance relative to the sliding pin 7 and being wrapped inside the connecting portion.

By arranging the reinforcing ribs 46 in a circumferentially spaced relationship, in an operation for mounting of the protective boot 41, the circumferential wall portions 44A of the connecting portion 44 are subject to elastic deformation in the circumferential direction thereof between the reinforcing ribs 46, so that the diameter of the connecting portion 44 as a whole is easily increased. Therefore, a tightening effect of a resilient force imparted to the pin-side mounting portion 45, which is generated due to a reaction force (restoring force) of the connecting portion, can be suppressed. This leads to suppression of the frictional resistance generated between the sliding pin 7 and the pin-side mounting portion 45, which corresponds to the resilient force.

The disc brake in this embodiment is arranged in the above-mentioned manner. With respect to a basic operation of the disc brake, there is no noteworthy difference between the second embodiment and the related art.

Figure 10:
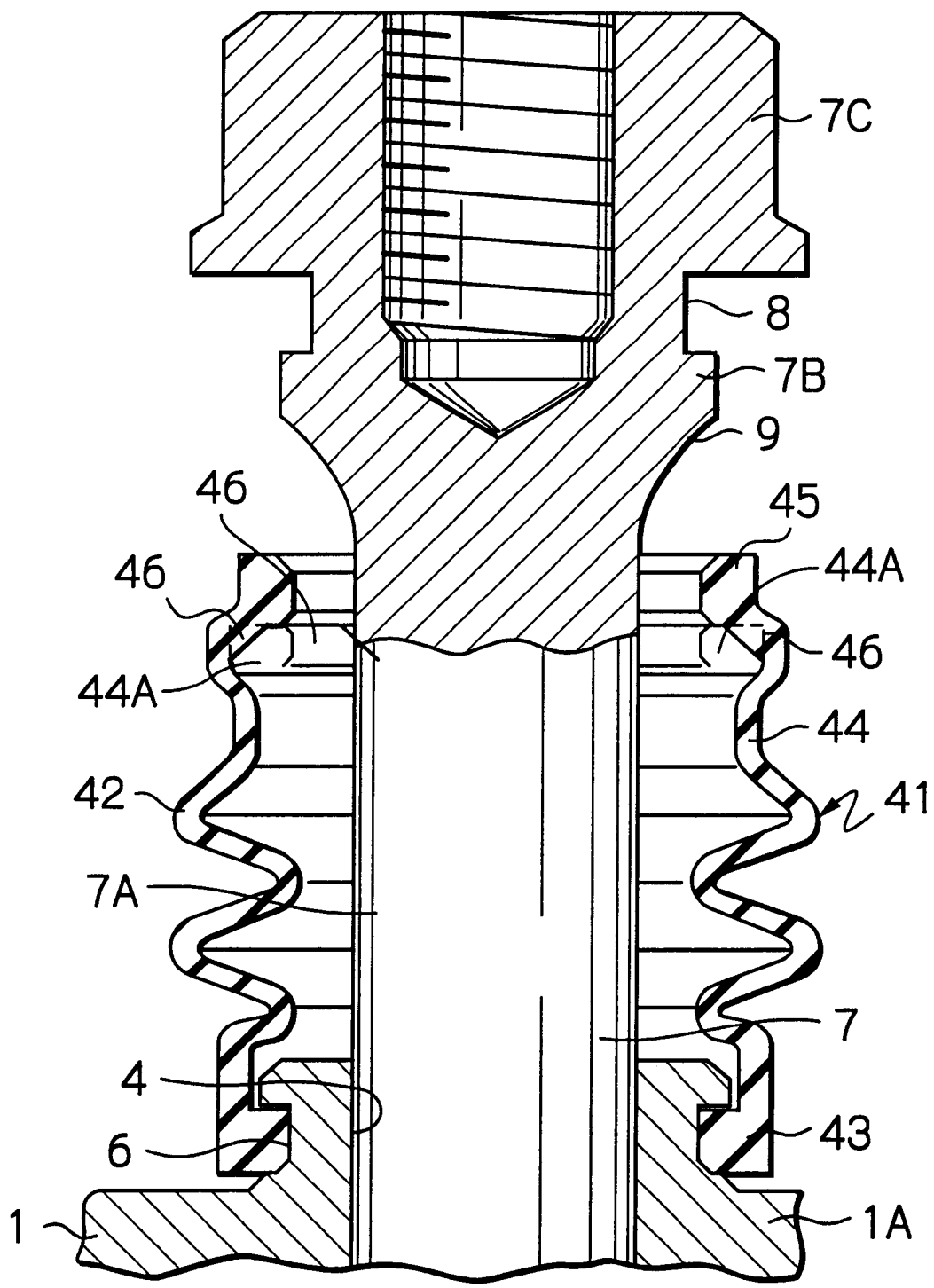
FIG. 10 is an enlarged cross-sectional view showing a state in which a guide-bore-side mounting portion of the protective boot is fitted into a first boot mounting groove of the mounting member in an operation for mounting of the boot.

Next, referring to FIGS. 10 and 11, a description is made with regard to an operation for mounting of the protective boot 41.

First, as shown in FIG. 10, prior to insertion of the sliding pin 7 into the guide bore 4 of the mounting member 1, the guide-bore-side mounting portion 43 of the protective boot 41 is fitted into the first boot mounting groove 6 of the mounting member 1. Consequently, the protective boot 41 is attached to the arm 1A and freely extends in a cylindrical form.

Subsequently, using, for example, an automatic mounting apparatus (not shown), the pin shaft portion 7A of the sliding pin 7 is inserted into the protective boot 41 and is gradually inserted in the direction A in FIG. 11 into the guide bore 4 of the mounting member 1. Then, when the guiding surface 9 of the sliding pin 7 is brought into sliding contact with the pin-side mounting portion 45 of the protective boot 41, the bellows portion 42 of the protective boot 41 is axially compressed due to the effect of frictional resistance imparted to the pin-side mounting portion 45 by the guiding surface 9.

When the sliding pin 7 is inserted to a maximum depth into the guide bore 4, as shown in FIG. 11, the pin-side mounting portion 45 of the protective boot 41 is inclined due to bending of the connecting portion 44. In this state, the pin-side mounting portion 45 receives the restoring force of the bellows portion 42, so that the pin-side mounting portion 45 is guided by the guiding surface 9 of the sliding pin 7 and moved over the annular protruding portion 7B, while being slidably moved along the guiding surface 9. Consequently, the pin-side mounting portion 45 is mounted with an interference fit into the second boot mounting groove 8 of the sliding pin 7. Thus, the mounting of the protective boot 41 between the guide bore 4 of the mounting member 1 and the sliding pin 7 can be achieved.

When the pin-side mounting portion 45 slidably moves along the guiding surface 9 of the sliding pin 7, since a portion in the vicinity of the pin-side mounting portion 45 is imparted with appropriately high stiffness by the reinforcing ribs 46, the pin-side mounting portion 45 is supported substantially uniformly along an entire circumference thereof by the reinforcing ribs 46. This prevents the pin-side mounting portion 45 from bending radially inward to a large extent due to the frictional resistance relative to the guiding surface 9.

When the pin-side mounting portion 45 is slidably moved along the guiding surface 9 toward the second boot mounting groove 8, the other end side of the protective boot 41 is subject to elastic deformation to gradually increase the diameter thereof. In this instance, the other end side of the connecting portion 44 is easily extended in the circumferential direction thereof, so that the diameter of the connecting portion 44 increases substantially uniformly throughout an entire circumference of the connecting portion. Therefore, the tightening effect of the resilient force applied to the pin-side mounting portion 45 through the connecting portion 44 can be suppressed.

Consequently, the frictional resistance generated between the guiding surface 9 of the sliding pin 7 and the pin-side mounting portion 45 of the protective boot 41 can be suppressed and the pin-side mounting portion 45 can be slidably moved smoothly along the guiding surface 9 toward the second boot mounting groove 8 against the frictional resistance.

Thus, in the second embodiment, the reinforcing ribs 46 are arranged in a circumferentially spaced relationship at the connecting portion 44 of the protective boot 41. Therefore, it is possible to increase the stiffness of the protective boot 41 in the vicinity of the pin-side mounting portion 45. In an operation for mounting of the protective boot 41, the pin-side mounting portion 45 can be slidably moved along the guiding surface 9 in a stable manner while being supported by the reinforcing ribs 46.

Consequently, when the sliding pin 7 is inserted into the guide bore 4, bending of the pin-side mounting portion 45 inside the connecting portion due to the frictional resistance relative to the guiding surface 9 can be surely suppressed, and the pin-side mounting portion 45 can be smoothly fitted into the second boot mounting groove 8 of the sliding pin 7.

Further, the reinforcing ribs 46 serve to increase the stiffness of the connecting portion 44 at a plurality of positions in the circumferential direction and appropriate flexibility can be imparted to the circumferential wall portions 44A. Therefore, when the pin-side mounting portion 45 is slidably moved along the guiding surface 9 while the diameter thereof is increased, the diameter of the connecting portion 44 can be easily increased by means of the circumferential wall portions 44A.

Consequently, as compared to, for example, forming an annular thick-walled portion along the entire circumference of the connecting portion 44 instead of forming the reinforcing ribs 46, the second embodiment is advantageous in that it is possible to suppress the tightening effect of the resilient force applied to the pin-side mounting portion 45 through the connecting portion 44, thus enabling the pin-side mounting portion 45 to be smoothly fitted into the second boot mounting groove 8 against the frictional resistance generated between the pin-side mounting portion 45 and the sliding pin 7.

Accordingly, in the second embodiment, the pin-side mounting portion 45 of the protective boot 41 can be efficiently attached to the second boot mounting groove 8 of the sliding pin 7, thus enabling a smooth operation for mounting of the protective boot.

Figure 12:
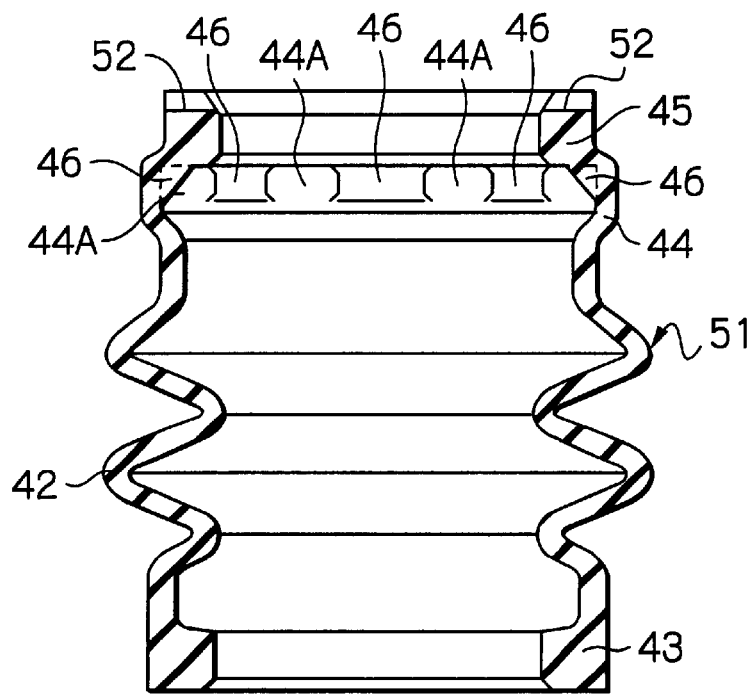
FIG. 12 is a vertical cross-sectional view showing a protective boot of a disc brake in a third embodiment of the present invention.
Figure 13:
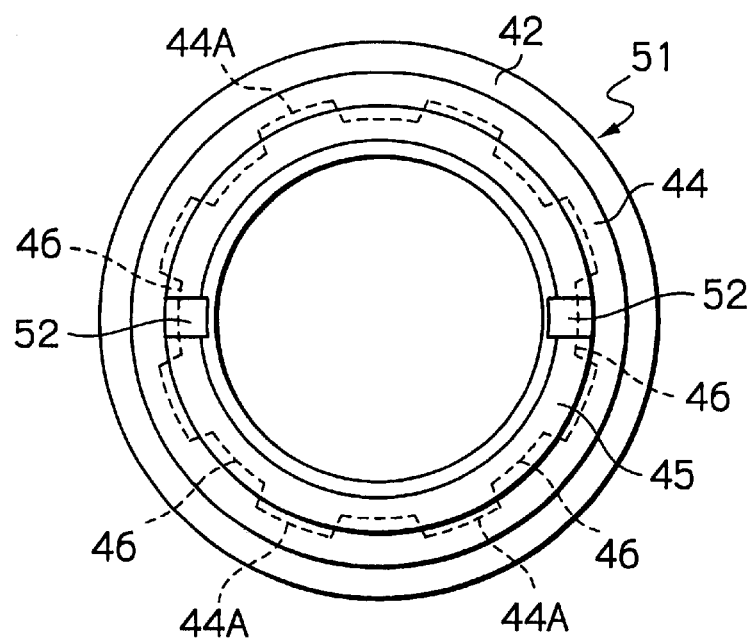
FIG. 13 is a plan view of the protective boot shown in FIG. 12.
Figure 14:
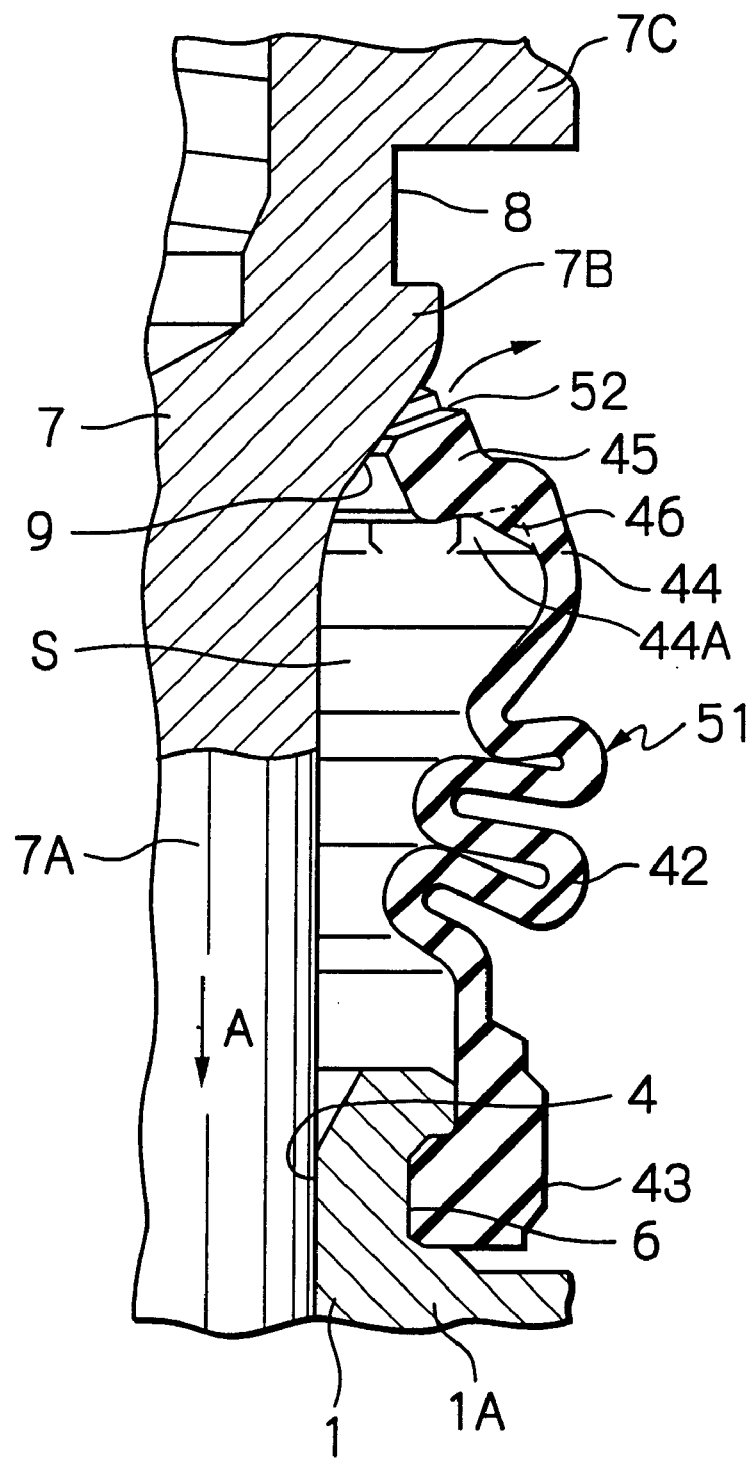
FIG. 14 is an enlarged cross-sectional view showing how an escape of air from the protective boot through an air passage groove to the outside is effected in an operation for mounting of the boot.

FIGS. 12 to 14 show a third embodiment of the present invention. The third embodiment is characterized in that communication passages are provided at the pin mounting portion. In the third embodiment, elements which are the same as those shown in the second embodiment are designated by the same reference numerals and characters, and explanation thereof is omitted.

Reference numeral 51 denotes a protective boot which is applied to the third embodiment instead of the protective boot 41. The protective boot 51 is arranged in substantially the same manner as the protective boot 41 in the second embodiment, and comprises the bellows portion 42, the guide-bore-side mounting portion 43, the connecting portion 44, the pin-side mounting portion 45 and the reinforcing ribs 46. However, in the third embodiment, two air passage grooves 52 are formed at the pin-side mounting portion 45 of the protective boot 51.

The air passage grooves 52 as communication passages are formed in the end face of the pin-side mounting portion 45. As shown in FIGS. 12 and 13, each air passage groove 52 formed as a concave channel radially extends through the end face of the pin-side mounting portion 45 and opens to a radially inner side and a radially outer side of the pin-side mounting portion 45. The air passage grooves 52 are circumferentially arranged at positions corresponding to the reinforcing ribs 46.

In an operation for mounting of the protective boot 51, as shown in FIG. 14, when the pin-side mounting portion 45 is slidably moved along the guiding surface 9 of the sliding pin 7 in an inclined state, the annular space S formed between the protective boot 51 and the sliding pin 7 communicates with the outside of the boot through the air passage grooves 52, and the air contained in the annular space S is discharged to the outside.

When the pin-side mounting portion 45 is fitted into the second boot mounting groove 8 of the sliding pin 7, the air passage grooves 52 are sealed off from the annular space S. Therefore, the slide surfaces of the sliding pin 7 and the guide bore 4 can be surely sealed by the protective boot 51.

Thus, the third embodiment has substantially the same effect as obtained in the second embodiment. In addition, in the third embodiment, due to the air passage grooves 52 provided at the pin-side mounting portion 45, durability and performance of the disc brake can be improved.

That is, in the related art, the air in the annular space S is likely to remain in a compressed state after mounting of the protective boot 11. Therefore, during braking, the pressure of the compressed air is transmitted through the caliper 2 to the friction pads 3. Consequently, the contact pressure of the friction pads 3 relative to the disc 16 becomes high, thereby increasing dragging of the friction pads 3 when the brake has been released, leading to rapid wear of the friction pads 3.

When a countermeasure is taken simply by providing an air passage groove at the pin-side mounting portion 15 of the protective boot 11 and the air pressure in the annular space S is reduced by the air passage groove during mounting of the boot, the pin-side mounting portion 15 is easily bent inside the connecting portion 14 due to the frictional resistance relative to the sliding pin 7. This lowers operability for mounting of the protective boot.

In the third embodiment of the present invention, both the reinforcing ribs 46 and the air passage grooves 52 are formed in the protective boot 51. Therefore, during mounting of the boot, the air compressed in the annular space S can be discharged to the outside through the air passage grooves 52, while bending of the pin-side mounting portion 45 inside the connecting portion 44 can be suppressed by the reinforcing ribs 46, regardless of reduction in air pressure in the annular space S. Therefore, it is possible to prevent dragging of the friction pads 3 while improving operability for mounting of the boot, thus ensuring stability of operation of the disc brake for a prolonged period of time.

Figure 15:
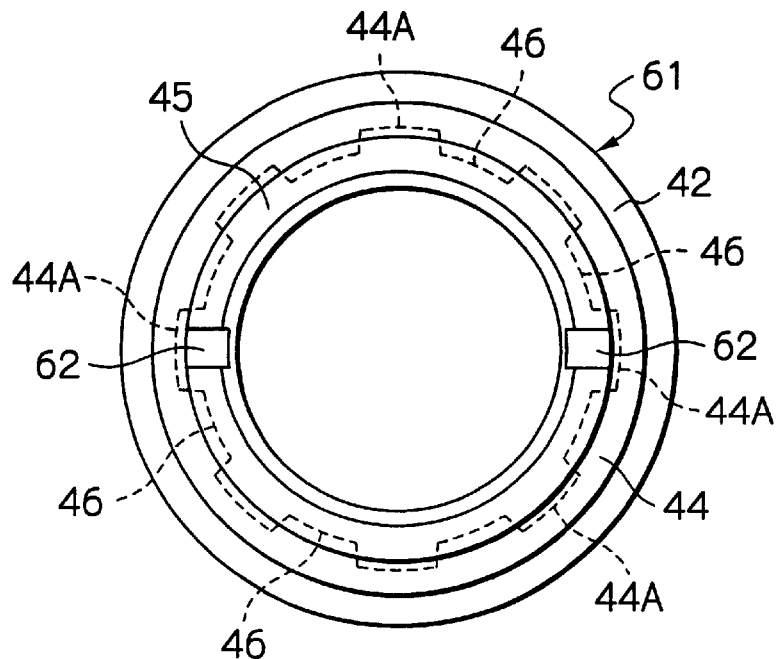
FIG. 15 is a plan view of a protective boot of a disc brake in a fourth embodiment of the present invention.
Figure 16:
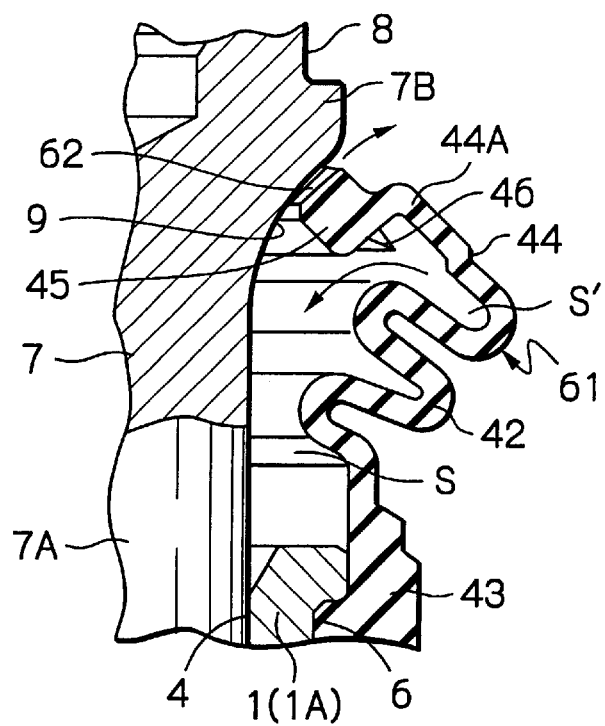
FIG. 16 is an enlarged cross-sectional view showing how an escape of air from the protective boot through an air passage groove to the outside is effected in an operation for mounting of the boot.

FIGS. 15 and 16 show a fourth embodiment of the present invention. The fourth embodiment is characterized in that communication passages are circumferentially arranged at positions different from those of the reinforcing ribs. In the fourth embodiment, elements which are the same as those shown in the second embodiment are designated by the same reference numerals and characters, and explanation thereof is omitted.

Reference numeral 61 denotes a protective boot which is applied to this embodiment instead of the protective boot 41 in the second embodiment. The protective boot 61 is arranged in substantially the same manner as the protective boot 41 in the second embodiment. It comprises the bellows portion 42, the guide-bore-side mounting portion 43, the connecting portion 44, the pin-side mounting portion 45 and the reinforcing ribs 46. Air passage grooves 62 are formed in the end face of the pin-side mounting portion 45.

The air passage grooves 62 are circumferentially arranged at positions different from those of the reinforcing ribs 46. That is, the air passage grooves 62 are arranged at positions corresponding to the circumferential wall portions 44A of the connecting portion 44 between the ribs.

The fourth embodiment has substantially the same effect as obtained in the second embodiment. In addition, in the fourth embodiment in which the air passage grooves 62 are provided at the positions corresponding to the flexible circumferential wall portions 44A, in an operation for mounting of the protective boot 61 as shown in FIG. 16, the portions of the pin-side mounting portion 45 in which the air passage grooves 62 are formed can be smoothly inclined radially inward by means of the circumferential wall portions 44A. Therefore, the air in the annular space S can be discharged with a high degree of reliability. Further, the air remaining in a space S' shown in FIG. 16 can be guided from a position close to the air passage grooves 62 toward the sliding pin 7.

Figure 17:
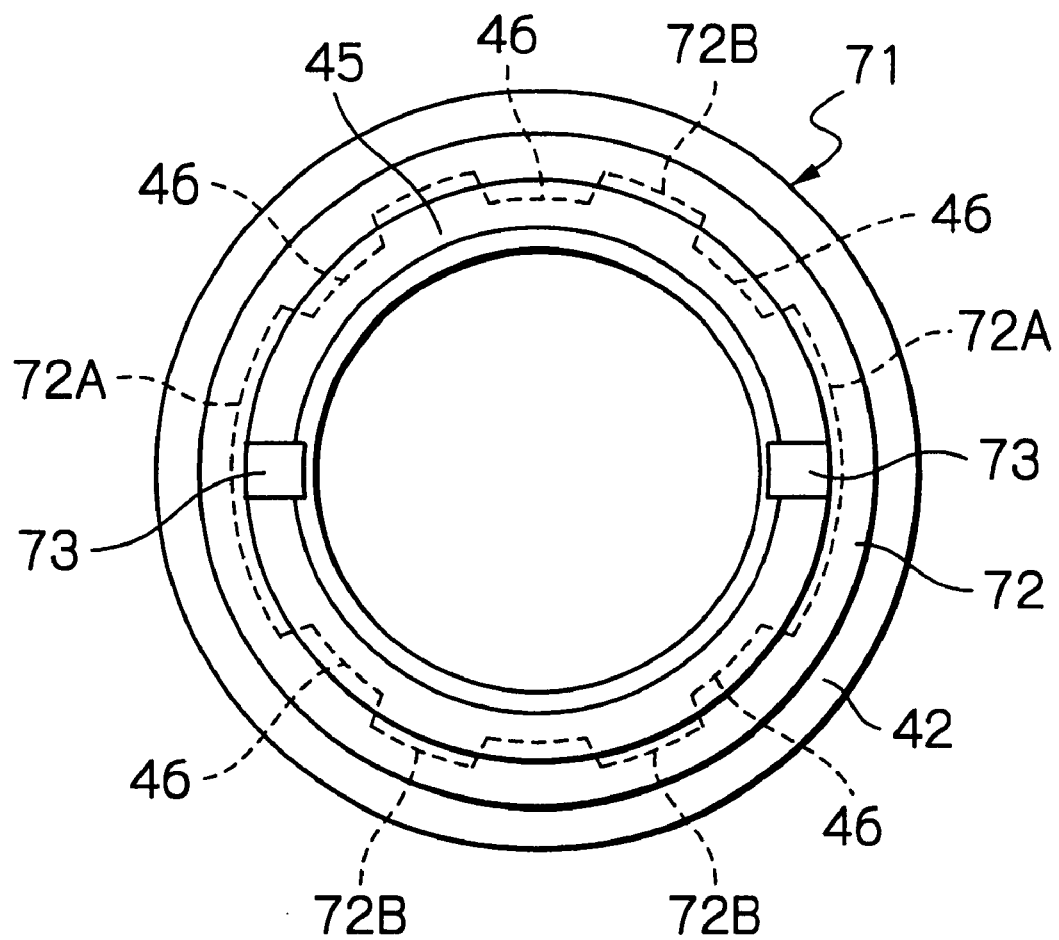
Figure 18:
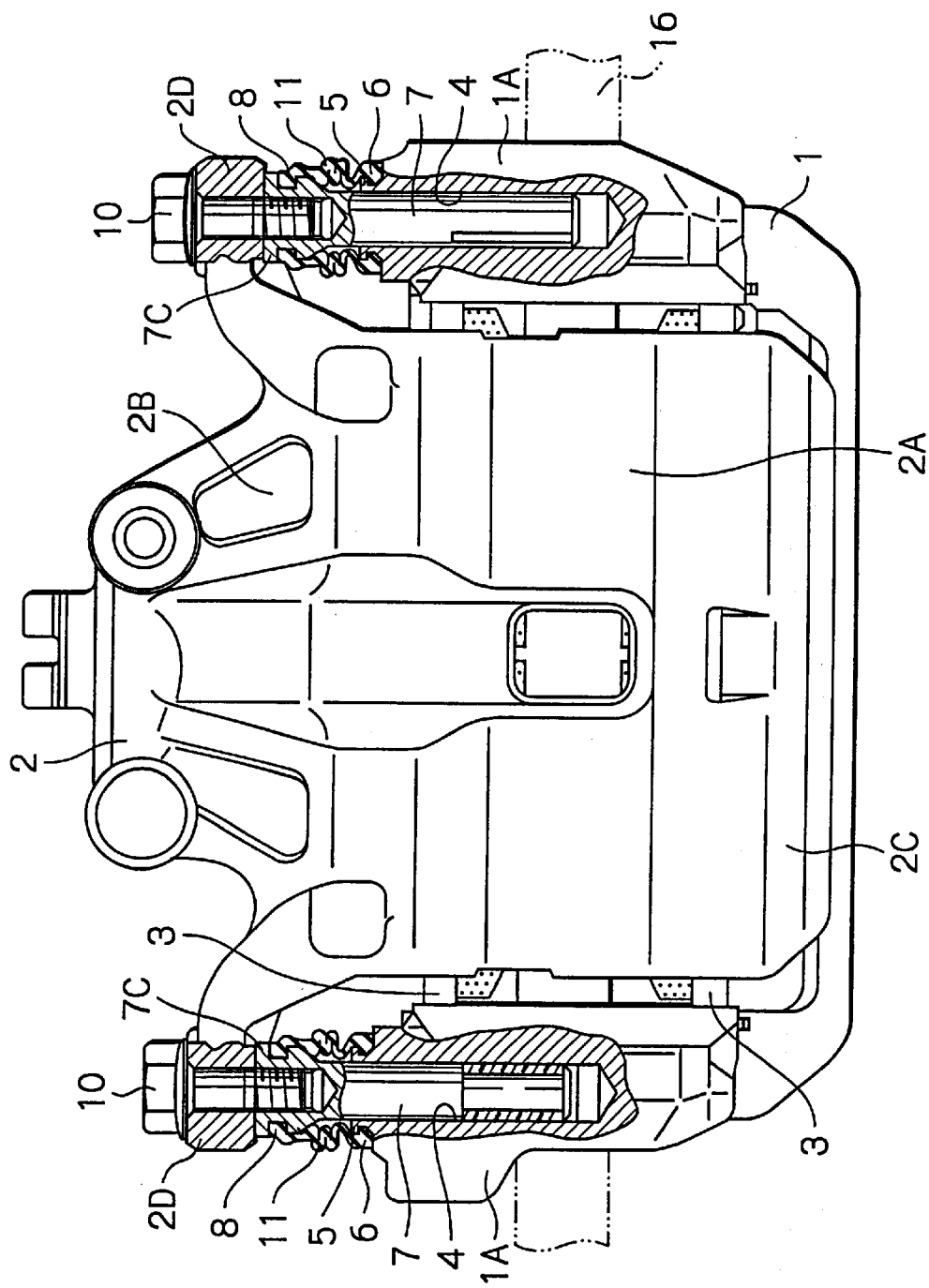
FIG. 18 is a front view of a prior art disc brake.
Figure 19:
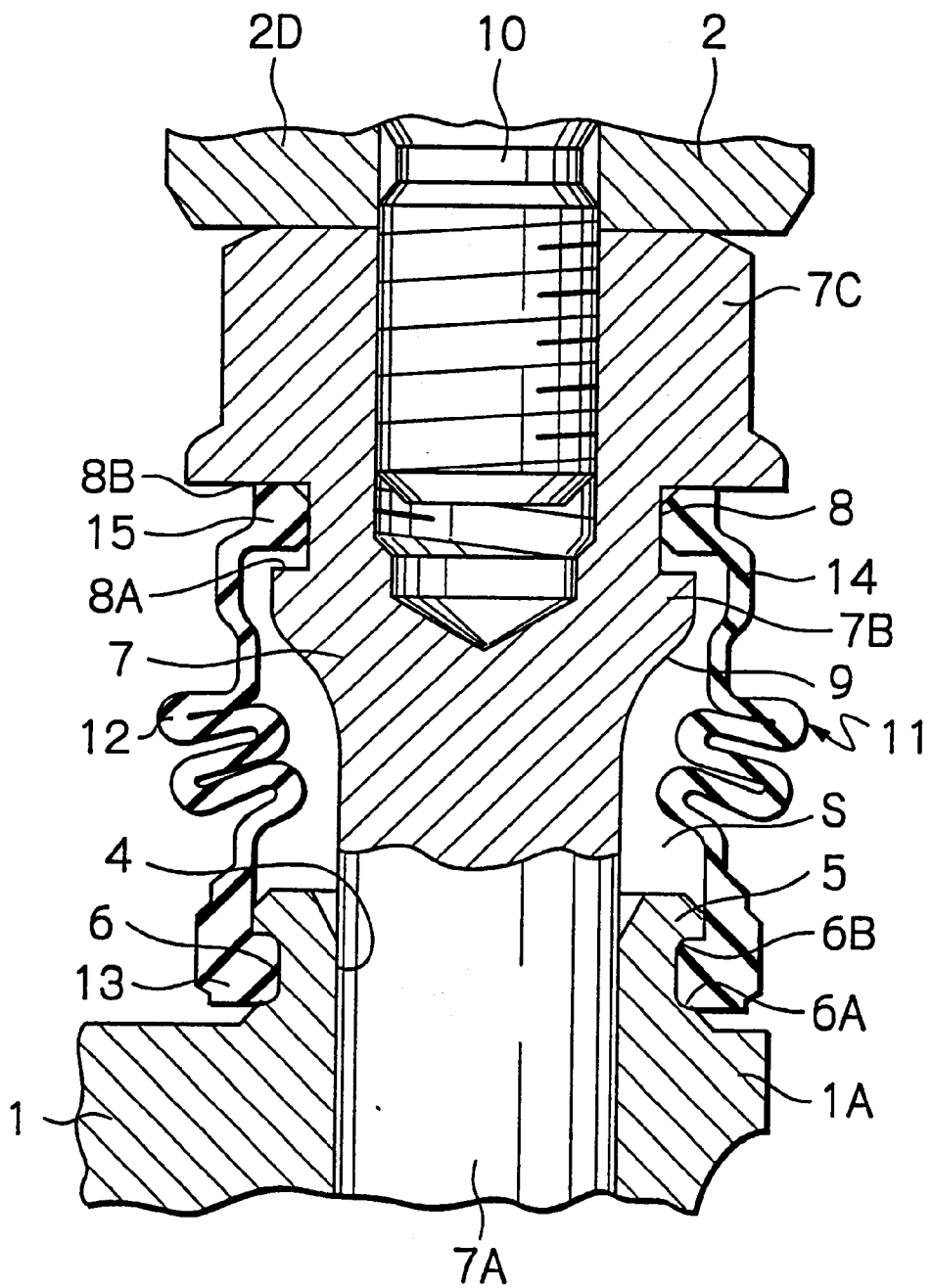
FIG. 19 is an enlarged cross-sectional view showing a sliding pin and a protective boot shown in FIG. 18.
Figure 20:
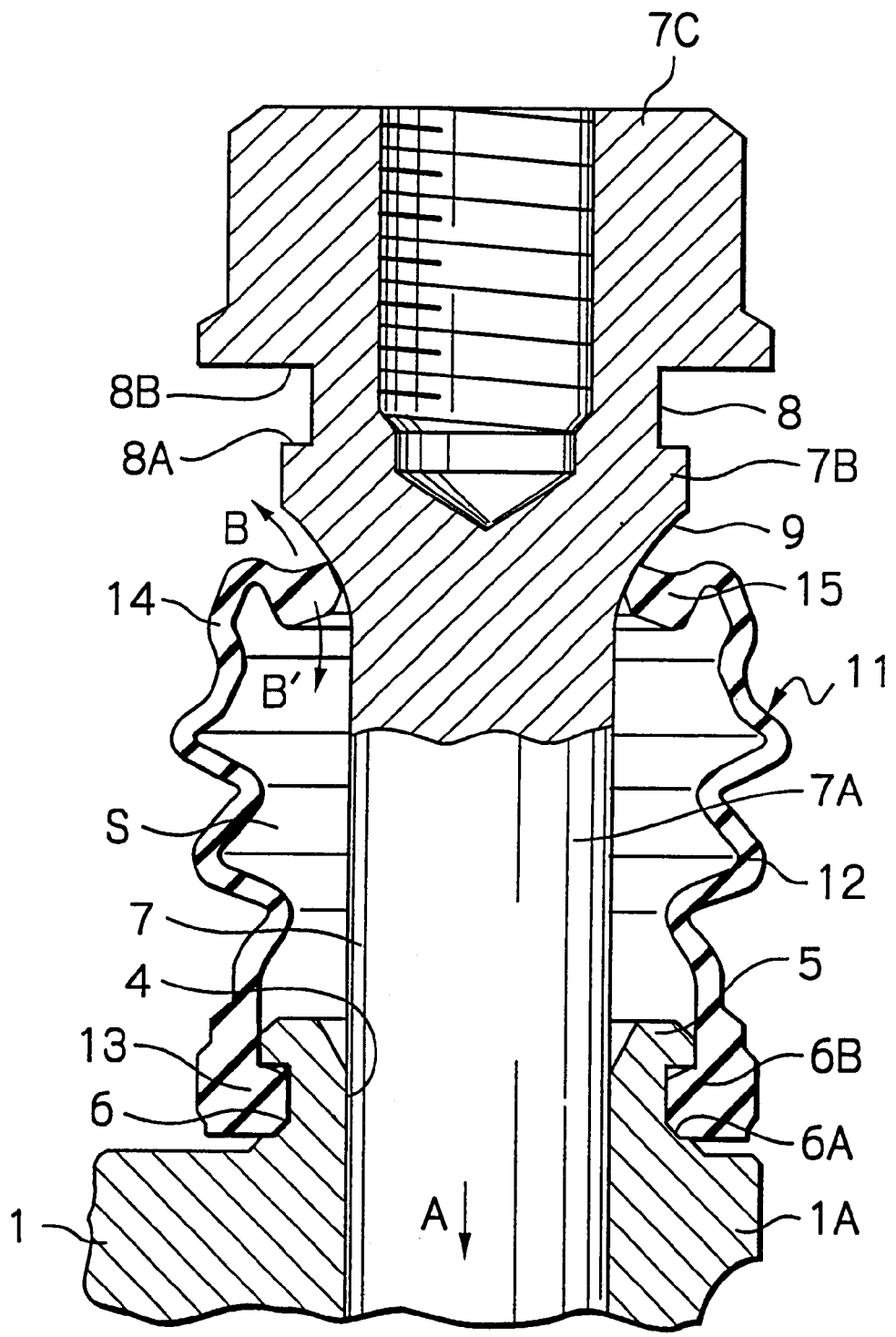
FIG. 20 is an enlarged cross-sectional view showing a state in which an end portion of the protective boot undesirably bends in an operation for mounting of the boot.

FIG. 17 shows a fifth embodiment of the present invention. The fifth embodiment is characterized in that the space between the reinforcing ribs at a position corresponding to each communication passage is large. In the fifth embodiment, elements which are the same as those shown in the second embodiment are designated by the same reference numerals and characters, and explanation thereof is omitted.

Reference numeral 71 denotes a protective boot which is applied to this embodiment instead of the protective boot 41. The protective boot 71 is arranged in substantially the same manner as the protective boot 41 in the second embodiment. It comprises the bellows portion 42, the guide-bore-side mounting portion 43, a connecting portion 72, the pin-side mounting portion 45 and the reinforcing ribs 46.

However, differing from the second embodiment, two circumferential spaces between the reinforcing ribs 46 are larger than the other spaces between the reinforcing ribs. At the connecting portion 72, circumferential wall portions 72A located at those two spaces have large lengths with respect to a circumferential direction thereof, as compared to circumferential wall portions 72B located at the other spaces. Air passage grooves 73 are formed in the end face of the pin-side mounting portion 45 at positions corresponding to the circumferential wall portions 72A with respect to the circumferential direction.

Thus, the fifth embodiment has substantially the same effect as obtained in the forth embodiment. In addition, at the connecting portion 72 in the fifth embodiment, high flexibility can be imparted to the circumferential wall portions 72A provided at positions corresponding to the air passage grooves 73, thereby improving the performance of the air passage grooves 73 to effect an escape of air.

In the above-mentioned embodiments, 6 or 8 reinforcing ribs 46 are formed at the connecting portion 44 or 72 of the protective boot 41, 51, 61 or 71. This does not limit the present invention. The protective boot may include reinforcing ribs of an arbitrary number. For example, a single reinforcing rib in a substantially C-form extending in the circumferential direction may be provided.

Further, in the above-mentioned embodiments, with respect to the mounting member 1 and the caliper 2, the guide bore 4 is formed in the mounting member 1 and the sliding pin 7 is connected to the caliper 2. This does not limit the present invention. An arrangement may be made by connecting the sliding pin to the mounting member and forming the guide bore in the caliper.

As has been described above, in one embodiment of the present invention, the protective boot comprises the bellows portion, the guide-bore-side mounting portion, the cylindrical portion, the thick-walled portion, the thin-walled portion and the pin-side mounting portion. Therefore, in an operation for mounting of the protective boot, radially inward bending of an end portion of the protective boot to an undesirable extent can be suppressed by the thick-walled portion, thus ensuring a stable sliding motion of the pin-side mounting portion along the outer circumferential surface of the sliding pin. Consequently, the operation for mounting of the protective boot can be smoothly conducted. After mounting of the protective boot, the slide surfaces of the sliding pin and the guide bore can be reliably sealed by the protective boot.

In another embodiment of the present invention, the cylindrical portion and the thick-walled portion have substantially the same radial size, so that the protective boot as a whole can be obtained in a cylindrical form extending along a predetermined cylindrical surface. Therefore, radial buckling of the bellows portion can be suppressed when it is subject to compressive deformation and the bellows portion can be extended and contracted smoothly along the cylindrical surface. Therefore, the restoring force of the bellows portion can be stably applied to the pin-side mounting portion through the thick-walled portion, and the pin-side mounting portion can be reliably moved along the outer circumferential surface of the sliding pin.

In a further embodiment of the present invention, the length ($L_1$) between the mounting portions when the bellows portion of the protective boot is axially compressed to a large extent is greater than the length ($L_2$) between the boot mounting grooves when the sliding pin is inserted to a maximum depth into the guide bore. By this arrangement, when the sliding pin is inserted to the maximum depth into the guide bore, the pin-side mounting portion can be slidably moved to the axial position corresponding to the second boot mounting groove and the pin-side mounting portion can be reliably fitted into the second boot mounting groove.

In a further embodiment of the present invention, the outer circumferential surface of the sliding pin includes the boot guiding portion. By this arrangement, when the sliding pin is inserted into the guide bore, the pin-side mounting portion of the protective boot can be guided into the second boot mounting groove while being slidably moved along the boot guiding portion. Thus, the operation for mounting of the protective boot can be smoothly conducted.

In a further embodiment of the present invention, in an operation for insertion of the sliding pin, the air contained in the protective boot can be discharged through the air passage groove of the pin-side mounting portion to the outside. Therefore, the sliding pin can be smoothly inserted into the guide bore and an operation for mounting of the caliper subsequent to the mounting of the protective boot can be easily conducted.

In a further embodiment of the present invention, the connecting portion of the protective boot includes a reinforcing rib formed along a part of an entire circumferential length thereof for suppressing bending of the pin-side mounting portion toward a radially inner side of the connecting portion during mounting of the protective boot. The reinforcing rib serves to increase the stiffness of the protective boot in the vicinity of the pin-side mounting portion. During mounting of the protective boot, the pin-side mounting portion can be slidably moved along the outer circumferential surface of the sliding pin in a stable manner, while preventing the pin-side mounting portion from bending inside the connecting portion due to the frictional resistance relative to the sliding pin. Further, for example, by forming a plurality of reinforcing ribs in a circumferentially spaced relationship at the connecting portion, appropriate flexibility can be imparted to the connecting portion at the portions between the reinforcing ribs. Therefore, even when the reinforcing ribs are formed at the connecting portion, the tightening effect of the resilient force applied to the pin-side mounting portion through the connecting portion can be suppressed, so that the pin-side mounting portion can be smoothly attached to the sliding pin against the frictional resistance. Thus, the mounting of the protective boot can be efficiently conducted.

In a further embodiment of the present invention, the disc brake further comprises a plurality of reinforcing ribs arranged in a circumferential direction of the protective boot. By this arrangement, stiffness of the connecting portion can be increased at a plurality of positions in the circumferential direction.

In a further embodiment of the present invention, the reinforcing ribs are arranged in a substantially equally spaced relationship in the circumferential direction of the protective boot. By this arrangement, the stiffness of the connecting portion can be increased uniformly in the circumferential direction.

In a further embodiment of the present invention, the pin-side mounting portion includes a communication passage. By this arrangement, during mounting of the boot, the air which is compressed in the protective boot can be discharged to the outside through the communication passage. Even when the air pressure in the protective boot is reduced by the communication passage, bending of the pin-side mounting portion inside the connecting portion can be suppressed by the reinforcing rib(s), thus ensuring a smooth operation for mounting of the boot. Further, during braking, no high pressure of air remains in the protective boot. Therefore, dragging of the friction pads due to application of air pressure to the sliding pin can be prevented, to thereby improve durability and performance of the disc brake.

In a further embodiment of the present invention, the communication passage is formed at a position different from the position(s) of the reinforcing rib(s). By this arrangement, the communication passage can be disposed at a position corresponding to a flexible portion of the connecting portion of the protective boot. Therefore, during mounting of the boot, the pin-side mounting portion can be smoothly inclined radially inward at the position corresponding to the communication passage, so that an escape of air from the protective boot can be reliably effected.

In a further embodiment of the present invention, a space between the reinforcing ribs which circumferentially overlaps the communication passage has a greater circumferential length than a space between the reinforcing ribs which does not overlap the communication passage. Therefore, high flexibility can be imparted to the portion of the connecting portion located in the space corresponding to the communication passage, thereby improving the performance of the communication passage to effect an escape of air.

The entire disclosure of Japanese Patent Application Nos. 2000-263478 filed on Aug. 31, 2000 and 2000-365341 filed on Nov. 30, 2000 including specification, claims, drawings and summary is incorporated herein by reference in its entirety.

What is claimed is:

1. A disc brake comprising:
    a mounting member mounted on a non-rotatable portion of a vehicle;
    a caliper displaceable in an axial direction of a disc relative to the mounting member and adapted to press a pair of friction pads against the disc;
    a guide bore formed in one of the mounting member and the caliper and extending in the axial direction of the disc;
    a sliding pin attached to the other of the mounting member and the caliper and inserted into the guide bore so as to support the caliper in a slidable manner; and
    a protective boot adapted to protect slide surfaces of the sliding pin and the guide bore,
    the protective boot having a generally cylindrical form extending along a predetermined cylindrical surface,
    wherein the protective boot comprises:
        a bellows portion in a cylindrical form enclosing the sliding pin and capable of extending and contracting in an axial direction of the sliding pin;
        a guide-bore-side mounting portion connected to one end of the bellows portion and attached to the mounting member or caliper at a position around an open end of the guide bore;
        a cylindrical portion formed between the guide-bore-side mounting portion and the bellows portion and axially extending around the sliding pin;
        a thick-walled portion connected to the other end of the bellows portion and having a greater wall thickness than the bellows portion so as to increase stiffness of the protective boot, both the thick-walled portion and the cylindrical portion being centered on the cylindrical surface;
        a thin-walled portion having one end thereof connected to the thick-walled portion on a side thereof opposite the bellows portion and having a smaller wall thickness than the thick-walled portion, the thin-walled portion being capable of bending axially and radially; and
        a pin-side mounting portion having one end thereof connected to the thin-walled portion on a side thereof opposite the thick-walled portion and attached with an interference fit to an outer circumferential surface of the sliding pin.

2. The disc brake according to claim 1, wherein an outer circumferential surface of the mounting member or caliper at a position around the guide bore includes a first boot mounting groove into which the guide-bore-side mounting portion of the protective boot is fitted and the outer circumferential surface of the sliding pin includes a second boot mounting groove into which the pin-side mounting portion of the protective boot is fitted and wherein a length ($L_1$) between the guide-bore-side mounting portion and the pin-side mounting portion as measured when the bellows portion of the protective boot is axially compressed to a large extent is greater than a length ($L_2$) between the first boot mounting groove and the second boot mounting groove as measured when the sliding pin is inserted to a maximum depth into the guide bore.

3. The disc brake according to claim 2, wherein the outer circumferential surface of the sliding pin includes a boot guiding portion for guiding the pin-side mounting portion of the protective boot in a direction from the guide bore to the second boot mounting groove.

4. The disc brake according to claim 1, wherein the pin-side mounting portion includes a communication passage, the communication passage being adapted to bring a space formed between the protective boot and the sliding pin into communication with the outside, during mounting of the protective boot on the outer circumferential surface of the sliding pin.

5. The disc brake according to claim 2, wherein the pin-side mounting portion includes a communication passage, the communication passage being adapted to bring a space formed between the protective boot and the sliding pin into communication with the outside, during mounting of the protective boot on the outer circumferential surface of the sliding pin.

6. The disc brake according to claim 3, wherein the pin-side mounting portion includes a communication passage, the communication passage being adapted to bring a space formed between the protective boot and the sliding pin into communication with the outside, during mounting of the protective boot on the outer circumferential surface of the sliding pin.

7. A disc brake comprising:
    a mounting member mounted on a non-rotatable portion of a vehicle;
    a caliper displaceable in an axial direction of a disc relative to the mounting member and adapted to press a pair of friction pads against the disc;
    a guide bore formed in one of the mounting member and the caliper and extending in the axial direction of the disc;
    a sliding pin attached to the other of the mounting member and the caliper and inserted into the guide bore so as to support the caliper in a slidable manner; and
    a protective boot adapted to protect slide surfaces of the sliding pin and the guide bore,
    wherein the protective boot comprises:
        a bellows portion in a cylindrical form enclosing the sliding pin and capable of extending and contracting in an axial direction of the sliding pin;
        a guide-bore-side mounting portion connected to one end of the bellows portion and attached to the mounting member or caliper at a position around an open end of the guide bore;
        a thick-walled portion connected to the other end of the bellows portion and having a greater wall thickness than the bellows portion so as to increase stiffness of the protective boot;

a thin-walled portion having one end thereof connected to the thick-walled portion on a side thereof opposite the bellows portion and having a smaller wall thickness than the thick-walled portion, the thin-walled portion being capable of bending axially and radially; and a pin-side mounting portion having one end thereof connected to the thin-walled portion on a side thereof opposite the thick-walled portion and attached with an interference fit to an outer circumferential surface of the sliding pin, wherein an outer circumferential surface of the mounting member or caliper at a position around the guide bore includes a first boot mounting groove into which the guide-bore-side mounting portion of the protective boot is fitted and the outer circumferential surface of the sliding pin includes a second boot mounting groove into which the pin-side mounting portion of the protective boot is fitted, and wherein a length ($L_1$) between the guide-bore-side mounting portion and the pin-side mounting portion as measured when the bellows portion of the protective boot is axially compressed to a large extent is greater than a length ($L_2$) between the first boot mounting groove and the second boot mounting groove as measured when the sliding pin is inserted to a maximum depth into the guide bore.

8. The disc brake according to claim 7, wherein the outer circumferential surface of the sliding pin includes a boot guiding portion for guiding the pin-side mounting portion of the protective boot in a direction from the guide bore to the second boot mounting groove.

9. The disc brake according to claim 7, wherein the pin-side mounting portion includes a communication passage, the communication passage being adapted to bring a space formed between the protective boot and the sliding pin into communication with the outside, during mounting of the protective boot on the outer circumferential surface of the sliding pin.

10. The disc brake according to claim 8, wherein the pin-side mounting portion includes a communication passage, the communication passage being adapted to bring a space formed between the protective boot and the sliding pin into communication with the outside, during mounting of the protective boot on the outer circumferential surface of the sliding pin.

11. A disc brake comprising:

a mounting member mounted on a non-rotatable portion of a vehicle;

a caliper displaceable in an axial direction of a disc relative to the mounting member and adapted to press a pair of friction pads against the disc;

a guide bore formed in one of the mounting member and the caliper and extending in the axial direction of the disc;

a sliding pin attached to the other of the mounting member and the caliper and inserted into the guide bore so as to support the caliper in a slidable manner; and a protective boot adapted to protect slide surfaces of the sliding pin and the guide bore, wherein the protective boot comprises:

a bellows portion in a cylindrical form enclosing the sliding pin and capable of extending and contracting in an axial direction of the sliding pin;

a guide-bore-side mounting portion connected to one end of the bellows portion and attached to the mounting member or caliper at a position around an open end of the guide bore; and a pin-side mounting portion connected to the other end of the bellows portion through a cylindrical connecting portion and attached with an interference fit to an outer circumferential surface of the sliding pin, the cylindrical connecting portion between the bellows portion and the pin-side mounting portion including a reinforcing rib provided on an inner circumferential surface of the cylindrical connecting portion, the reinforcing rib being formed along a part of an entire circumferential length of the cylindrical connecting portion, so as to suppress bending of the pin-side mounting portion toward a radially inner side of the connecting portion during mounting of the protective boot on the outer circumferential surface of the sliding pin.

12. The disc brake according to claim 11, further comprising a plurality of reinforcing ribs arranged in a spaced relationship in a circumferential direction of the protective boot.

13. The disc brake according to claim 12, wherein the plurality of reinforcing ribs are arranged in a substantially equally spaced relationship in the circumferential direction of the protective boot.

14. The disc brake according to claim 12, wherein the pin-side mounting portion of the protective boot includes a communication passage for enabling air contained in a space formed between the protective boot and the sliding pin to be discharged to the outside during mounting of the protective boot on the outer circumferential surface of the sliding pin.

15. The disc brake according to claim 14, wherein the communication passage is formed at a position different from positions of the plurality of reinforcing ribs with respect to the circumferential direction of the protective boot.

16. The disc brake according to claim 15, wherein a space between the reinforcing ribs which circumferentially overlaps the communication passage has a greater circumferential length than a space between the reinforcing ribs which does not overlap the communication passage.

17. The disc brake according to claim 11, wherein the pin-side mounting portion of the protective boot includes a communication passage for enabling air contained in a space formed between the protective boot and the sliding pin to be discharged to the outside during mounting of the protective boot on the outer circumferential surface of the sliding pin.

18. The disc brake according to claim 17, wherein the communication passage is formed at a position different from a position of the reinforcing rib with respect to the circumferential direction of the protective boot.

19. The disc brake according to claim 13, wherein the pin-side mounting portion of the protective boot includes a communication passage for enabling air contained in a space formed between the protective boot and the sliding pin to be discharged to the outside during mounting of the protective boot on the outer circumferential surface of the sliding pin.

20. The disc brake according to claim 19, wherein the communication passage is formed at a position different from positions of the plurality of reinforcing ribs with respect to the circumferential direction of the protective boot.

21. The disc brake according to claim 20, wherein a space between the reinforcing ribs which circumferentially overlaps the communication passage has a greater circumferential length than a space between the reinforcing ribs which does not overlap the communication passage.

* * * * *